(12) United States Patent
Iwasaki

(10) Patent No.: US 9,779,334 B2
(45) Date of Patent: Oct. 3, 2017

(54) LIGHT-SOURCE-DRIVING CONTROL DEVICE, IMAGE FORMING APPARATUS, AND LIGHT-SOURCE DRIVING METHOD

(71) Applicant: Mitsutaka Iwasaki, Kanagawa (JP)

(72) Inventor: Mitsutaka Iwasaki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/201,701

(22) Filed: Jul. 5, 2016

(65) Prior Publication Data

US 2017/0011282 A1    Jan. 12, 2017

(30) Foreign Application Priority Data

Jul. 6, 2015   (JP) .................. 2015-135419

(51) Int. Cl.
*G06K 15/12*    (2006.01)
*G03G 15/043*   (2006.01)
*G03G 15/01*    (2006.01)

(52) U.S. Cl.
CPC ......... *G06K 15/1223* (2013.01); *G03G 15/01* (2013.01); *G03G 15/043* (2013.01)

(58) Field of Classification Search
CPC ... G06K 15/1223; G03G 15/01; G03G 15/043
See application file for complete search history.

(56) References Cited

U.S. PATENT DOCUMENTS

| 2005/0030435 | A1  | 2/2005  | Uemura |            |
|--------------|-----|---------|--------|------------|
| 2009/0154946 | A1* | 6/2009  | Nakase | G03G 15/326 |
|              |     |         |        | 399/52     |
| 2014/0153021 | A1* | 6/2014  | Matsumoto | H04N 1/17 |
|              |     |         |        | 358/1.13   |
| 2014/0333940 | A1* | 11/2014 | Iwata  | G03G 15/043 |
|              |     |         |        | 358/1.1    |
| 2016/0234399 | A1  | 8/2016  | Omori et al. |      |

FOREIGN PATENT DOCUMENTS

| JP | 2004-345220 | 12/2004 |
| JP | 2004-354986 | 12/2004 |
| JP | 2009-300832 | 12/2009 |
| JP |    4640257  | 12/2010 |
| JP |    4968902  |  4/2012 |
| JP | 2016-145945 |  8/2016 |

* cited by examiner

*Primary Examiner* — Iriana Cruz
(74) *Attorney, Agent, or Firm* — Cooper & Dunham LLP

(57) ABSTRACT

A light-source-driving control device thins a pixel at an edge portion of image data by a first pixel width; sets a second pixel width at the edge portion such that a ratio between the first and second pixel widths is constant; creates light amount information including a first light amount with which a pixel not included in the set second pixel width is exposed, and a second light amount with which a pixel included in the second pixel width is exposed; selects the first or second light amount based on a power-modulation control signal; drives light sources according to the selected light amount and a light-source-modulation pulse signal; and counts an addition value of pixel density considering a pixel width and a light amount, based on a data-width setting signal based on the second pixel width, and on a light-amount setting signal based on the light amount information.

8 Claims, 14 Drawing Sheets

FIG.17

| DATA-WIDTH SETTING SIGNAL | LIGHT-AMOUNT SETTING SIGNAL | PIXEL-DENSITY SETTING VALUE [1:0] |
|---|---|---|
| 0 | 0 | 0 |
| 0 | 1 | 0 |
| 1 | 0 | 1 |
| 1 | 1 | 2 |

FIG.18

| DATA-WIDTH SETTING SIGNAL [1:0] | | LIGHT-AMOUNT SETTING SIGNAL [1:0] | | PIXEL-DENSITY SETTING VALUE [5:0] |
|---|---|---|---|---|
| 0 | 0 | 0 | 0 | addgmm0 |
| 0 | 0 | 0 | 1 | addgmm1 |
| 0 | 0 | 1 | 0 | addgmm2 |
| 0 | 0 | 1 | 1 | addgmm3 |
| 0 | 1 | 0 | 0 | addgmm4 |
| 0 | 1 | 0 | 1 | addgmm5 |
| 0 | 1 | 1 | 0 | addgmm6 |
| 0 | 1 | 1 | 1 | addgmm7 |
| 1 | 0 | 0 | 0 | addgmm8 |
| 1 | 0 | 0 | 1 | addgmm9 |
| 1 | 0 | 1 | 0 | addgmma |
| 1 | 0 | 1 | 1 | addgmmb |
| 1 | 1 | 0 | 0 | addgmmc |
| 1 | 1 | 0 | 1 | addgmmd |
| 1 | 1 | 1 | 0 | addgmme |
| 1 | 1 | 1 | 1 | addgmmf |

LIGHT-SOURCE-DRIVING CONTROL DEVICE, IMAGE FORMING APPARATUS, AND LIGHT-SOURCE DRIVING METHOD

CROSS-REFERENCE TO RELATED APPLICATIONS

The present application claims priority under 35 U.S.C. §119 to Japanese Patent Application No. 2015-135419, filed Jul. 6, 2015. The contents of which are incorporated herein by reference in their entirety.

BACKGROUND OF THE INVENTION

1. Field of the Invention

The present invention relates to a light-source-driving control apparatus, an image forming apparatus, and a light-source driving method.

2. Description of the Related Art

In recent years, digital printers using electrophotographic process have been introduced to the field of production printing. In the field of production printing, there has been an increasing demand for improved image quality and reliability of electrophotographic images. To improve the image quality of electrophotographic images, reproductivity of thin lines and characters is demanded. Particularly, improvement of reproductivity of characters in minute sizes corresponding to 2 to 3 points, suppression of character thickening derived from the electrophotographic process, and the like are demanded.

Moreover, a digital printer in the field of production printing includes an optical scanner that enables multibeaming by applying a laser diode array (LDA) or a vertical cavity surface emitting laser (VCSEL) to a light source. This enables the optical scanner to form an electrostatic latent image at a resolution of 2400 dots per inch (dpi) or 4800 dpi, which is higher than that of an input image at a resolution of 1200 dpi or higher, thereby achieving the printing quality with a high image quality and a high speed.

For digital printers in the field of production printing, the optical scanner in which the image processing using high-resolution input image data and multibeaming are enabled as described above has been an effective means to improve the reproductivity of characters in a minute size (characters in a minute point size), to improve the reproductivity of a thin line, and the like.

However, according to a conventional image processing method, there is a problem that a thin line or a character in a minute size (character in a minute point size) cannot be reproduced clearly.

Furthermore, there is a demand for accurate measurement of a toner consumption amount when performing the processing to improve the reproductivity of a thin line and a character in a minute size (character in a minute point size) of an image.

SUMMARY OF THE INVENTION

According to one aspect of the present invention, a light-source-driving control device includes circuitry configured to convert a first resolution of image data into high resolution and perform thinning processing of thinning a pixel at an edge portion of the image data by a first pixel width, so as to create image data with a second resolution; set a second pixel width at the edge portion of the image data with the second resolution such that a ratio between the first pixel width and the second pixel width is constant; create light amount information including a first light amount with which a pixel not included in the set second pixel width is exposed, and a second light amount larger than the first light amount, the second light amount with which a pixel included in the second pixel width is exposed; generate a light-source-modulation pulse signal and a power-modulation control signal based on the image data with the second resolution; select either one of the first light amount and the second light amount as light-amount application current data based on the generated power-modulation control signal, the first light amount with which a pixel not included in the second pixel width of the edge portion thin-lined by the thinning processing is exposed, the second light amount with which a pixel included in the second pixel width of the edge portion is exposed with an increased light amount from the first light amount to perform intense exposure processing; drive light sources corresponding to respective colors, according to the selected light-source application current data, and the light-source-modulation pulse signal; and count an addition value of pixel density considering a width of pixel and a light amount, based on a data-width setting signal based on the created second pixel width, and on a light-amount setting signal based on the created light amount information.

BRIEF DESCRIPTION OF THE DRAWINGS

FIG. 17 illustrates a concept of a look-up table (LUT); and

FIG. 18 illustrates one example of the LUT.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
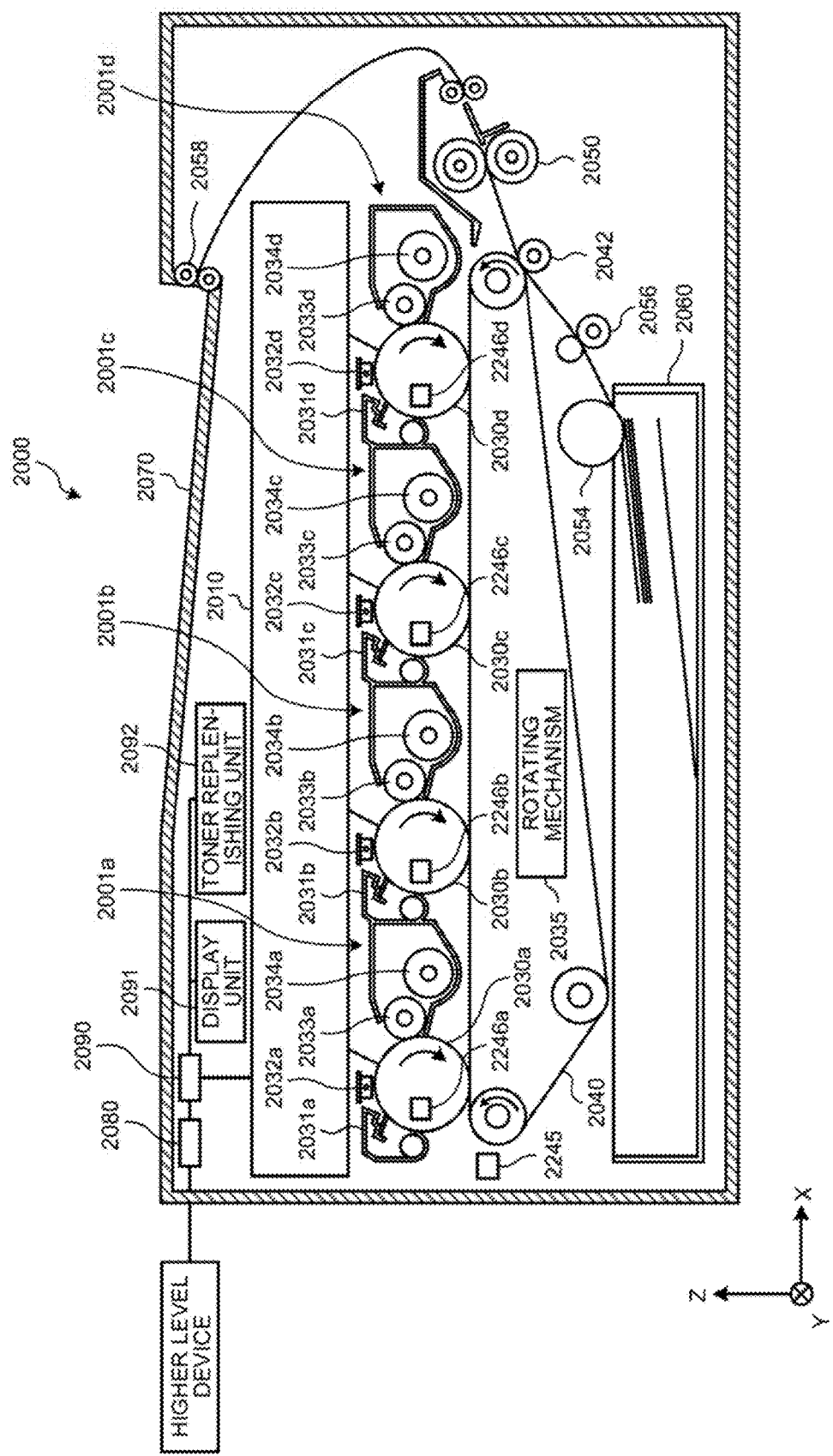
FIG. 1 is a vertical side view illustrating a schematic configuration of a color printer according to the present embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide a light-source driving control device that is capable of reproducing a thin line and a character in a minute size (character in a minute point size) of an image clearly, and measuring a toner consumption amount accurately when performing the processing to improve the reproductivity.

Embodiments of a light-source-driving control device, an image forming apparatus, and a light-source driving method are explained in detail below with reference to the accompanying drawings.

FIG. 1 is a vertical side view illustrating a schematic configuration of a color printer 2000 according to the present embodiment. As illustrated in FIG. 1, the color printer 2000 as an image forming apparatus is a tandem multicolor printer that forms a full color image by superimposing four colors (black (K), cyan (C), magenta (M), and yellow (Y)).

The color printer 2000 includes four photoconductor drums (2030a, 2030b, 2030c, 2030d) as scanned surfaces having a photosensitive surface. The four photoconductor drums (2030a, 2030b, 2030c, 2030d) correspond to the four colors (K, C, M, Y), respectively.

The color printer 2000 includes four cleaning units (2031a, 2031b, 2031c, 2031d) and four charging devices (2032a, 2032b, 2032c, 2032d), four developing rollers (2033a, 2033b, 2033c, 2033d), and four toner cartridges (2034a, 2034b, 2034c, 2034d) corresponding to the four photoconductor drums (2030a, 2030b, 2030c, 2030d).

Moreover, the color printer 2000 includes a transfer belt 2040, a transfer roller 2042, and a fixing roller 2050.

The toner cartridge 2034a contains black toner, and the toner is provided to the developing roller 2033a. The toner cartridge 2034b contains cyan toner, and the toner is provided to the developing roller 2033b. The toner cartridge 2034c contains magenta toner, and the toner is provided to the developing roller 2033c. The toner cartridge 2034d contains yellow toner, and the toner is provided to the developing roller 2033d.

Each of the charging devices (2032a, 2032b, 2032c, 2032d) uniformly charges a surface of the corresponding photoconductor drum (2030a, 2030b, 2030c, 2030d) prior to electrophotographic process.

The photoconductor drum 2030a, the charging device 2032a, the developing roller 2033a, the toner cartridge 2034a, and the cleaning unit 2031a are used as one set, and constitute an image forming station (hereinafter, "K station" for convenience) 2001a that forms a black image.

The photoconductor drum 2030b, the charging device 2032b, the developing roller 2033b, the toner cartridge 2034b, and the cleaning unit 2031b are used as one set, and constitute an image forming station (hereinafter, "C station" for convenience) 2001b that forms a cyan image.

The photoconductor drum 2030c, the charging device 2032c, the developing roller 2033c, the toner cartridge 2034c, and the cleaning unit 2031c are used as one set, and constitute an image forming station (hereinafter, "M station" for convenience) 2001c that forms a magenta image.

The photoconductor drum 2030d, the charging device 2032d, the developing roller 2033d, the toner cartridge 2034d, and the cleaning unit 2031d are used as one set, and constitute an image forming station (hereinafter, "Y station" for convenience) 2001d that forms a yellow image.

Each of the photoconductor drums (2030a, 2030b, 2030c, 2030d) has a photosensitive layer formed on the surface thereof. That is, the surface of each of the photoconductor drums (2030a, 2030b, 2030c, 2030d) is a scanned surface. The photoconductor drums (2030a, 2030b, 2030c, 2030d) are rotated by a rotating mechanism 2035 in the direction of arrows on a plane illustrated in FIG. 1.

Explanation is given herein, assuming a direction along a longitudinal direction of the photoconductor drums (2030a, 2030b, 2030c, 2030d) as a Y-axis direction, and a direction along an aligning direction of the four photoconductor drums (2030a, 2030b, 2030c, 2030d) as an X-axis direction in an XYZ three-dimensional Cartesian coordinate system.

Furthermore, the color printer 2000 includes an optical scanning device 2010 that forms an electrostatic latent image on the four photoconductor drums (2030a, 2030b, 2030c, 2030d). The optical scanning device 2010 is constituted roughly of a light source that emits a laser beam, a polygon mirror that deflects the laser beam from the light source, and a scanning optical system that guides the laser beam deflected by the polygon mirror to the surfaces of the four photoconductor drums (2030a, 2030b, 2030c, 2030d), and the like. Detailed configuration of this optical scanning device 2010 is described later.

The optical scanning device 2010 irradiates the charged surfaces of the four photoconductor drums (2030a, 2030b, 2030c, 2030d) with light beams that are modulated according to each color based on multicolor image data (black image data, cyan image data, magenta image data, and yellow image data) received from a higher level device (for example, a personal computer) through a communication control device 2080 described later and a network. Thus, only a part irradiated with light loses the electric charge on the surface of each of the photoconductor drums (2030a, 2030b, 2030c, 2030d), to form a latent image corresponding to the image data.

Note that the region in which image data is written on the photoconductor drums (2030a, 2030b, 2030c, 2030d) is called "effective scanning region", "image forming region", "effective image region", or the like.

The latent image formed on the surface of the photoconductor drum (2030a, 2030b, 2030c, 2030d) moves in a direction of the corresponding developing roller (2033a, 2033b, 2033c, 2033d) with rotation of the photoconductor drums (2030a, 2030b, 2030c, 2030d).

Each of the developing rollers (2033a, 2033b, 2033c, 2033d) receives toner contained in the corresponding toner cartridge (2034a, 2034b, 2034c, 2034d) applied thinly and uniformly on the surface thereof as rotating. Coming into contact with the surface of the corresponding photoconductor drum (2030a, 2030b, 2030c, 2030d), the toner on the surface of each of the developing rollers (2033a, 2033b, 2033c, 2033d) adheres only to the part of the surface having the latent image. In other words, each of the developing rollers (2033a, 2033b, 2033c, 2033d) visualizes the latent image that is formed on the surface of the corresponding photoconductor drum (2030a, 2030b, 2030c, 2030d) by adhering the toner.

The image (toner image) on which the toner is adhered moves in the direction of the transfer belt 2040 with rotation of the photoconductor drums (2030a, 2030b, 2030c, 2030d). That is, the respective toner images of yellow, magenta, cyan, and black are sequentially transferred onto the transfer belt 2040 at a predetermined time, and are superimposed on each other to form a color image.

Moreover, the color printer 2000 includes a paper-feed roller bearing 2054, a registration roller pair 2056, a paper ejecting roller 2058, a paper feed tray 2060, and a paper ejection tray 2070.

The paper feed tray 2060 stores recording paper. The paper-feed roller gearing 2054 arranged near the paper feed tray 2060 takes out the recording paper from the paper feed tray 2060 one by one, and conveys it to the registration roller pair 2056. The registration roller pair 2056 sends the recording paper to a gap between the transfer belt 2040 and the transfer roller 2042 at a predetermine time.

On the paper thus, sent to the gap between the transfer belt 2040 and the transfer roller 2042, the color image obtained by sequentially transferring images onto the transfer belt 2040 to be superimposed on each other is transferred. The recording paper on which the color image is transferred is conveyed to the fixing roller 2050.

The fixing roller 2050 applies heat and pressure to the recording paper, thereby fixing the toner on the recording paper. The recording paper fixed herein is sent to the ejection tray 2070 through the ejection roller 2058, and is sequentially put on the ejection tray 2070.

Thereafter, each of the cleaning units (2031a, 2031b, 2031c, 2031d) removes toner (residual toner) remaining on the surface of the corresponding photoconductor drum (2030a, 2030b, 2030c, 2030d). The surface of the photoconductor drum (2030a, 2030b, 2030c, 2030d) from which the residual toner has been removed returns to a position opposing to the corresponding charging device (2032a, 2032b, 2032c, 2032d) again and is charged uniformly.

Furthermore, the color printer 2000 includes a communication control device 2080, a density detector 2245, four home position sensors (2246a, 2246b, 2246c, 2246d), a printer control device 2090 that performs overall control of the above components, and the like.

The communication control device 2080 controls communication in both directions with a higher level device through a network and the like. The printer control device 2090 has a central processing unit (CPU), a read only memory (ROM) storing a program that is described in a code readable by the CPU and various kinds of data that is used when executing the program, a random access memory (RAM) that is a work memory, an analog-digital (AD) conversion circuit that converts analog data into digital data, and the like. The printer control device 2090 controls the respective components according to a request from a higher level device, and transmits multicolor image data (black image data, cyan image data, magenta image data, and yellow image data) received from a higher level device to the optical scanning device 2010.

Moreover, to the printer control device 2090, a display unit 2091 and a toner replenishing unit 2092 are connected as illustrated in FIG. 1. The printer control device 2090 controls the display unit 2091 and the toner replenishing unit 2092. The display unit 2091 displays various kinds of information relating to image forming. The toner replenishing unit 2092 supplies toner to the toner cartridges (2034a, 2034b, 2034c, 2034d).

Figure 2:
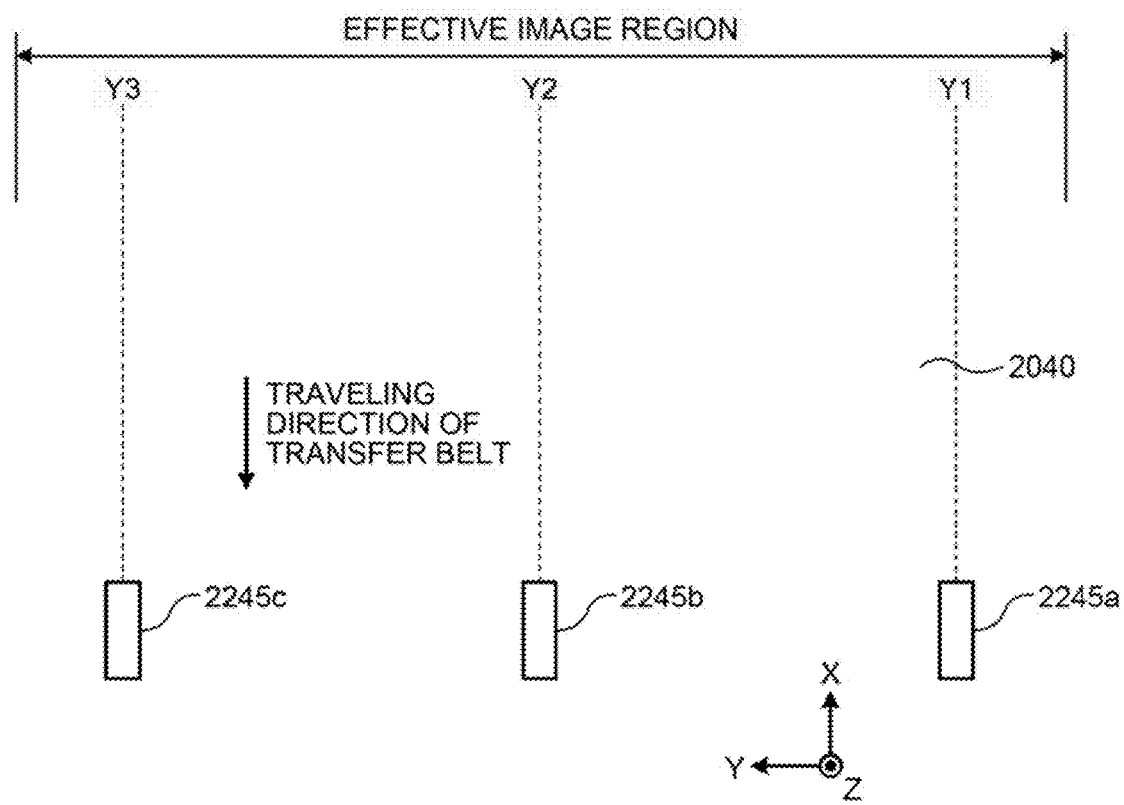
FIG. 2 is a plan view indicating a positional relation between a density detector and a transfer belt.

The density detector 2245 is arranged on a −X side of the transfer belt 2040. FIG. 2 is a plan view indicating a positional relation between the density detector 2245 and the transfer belt 2040. As illustrated in FIG. 2, the density detector 2245 has three optical sensors (2245a, 2245b, 2245c).

The optical sensor 2245a is arranged at a position opposing to a portion near an end on a −Y side in an effective image region of the transfer belt 2040. The optical sensor 2245c is arranged at a position opposing to a portion near an end on a +Y side in the effective image region of the transfer bel 2040. The optical sensor 2245b is arranged at substantially the center between the optical sensor 2245a and the optical sensor 2245c relative to a main scanning direction. In this example, a center position of the optical sensor 2245a is Y1, a center position of the optical sensor 2245b is Y2, and a center position of the optical sensor 2245c is Y3 relative to the main scanning direction (Y-axis direction).

Figure 3:
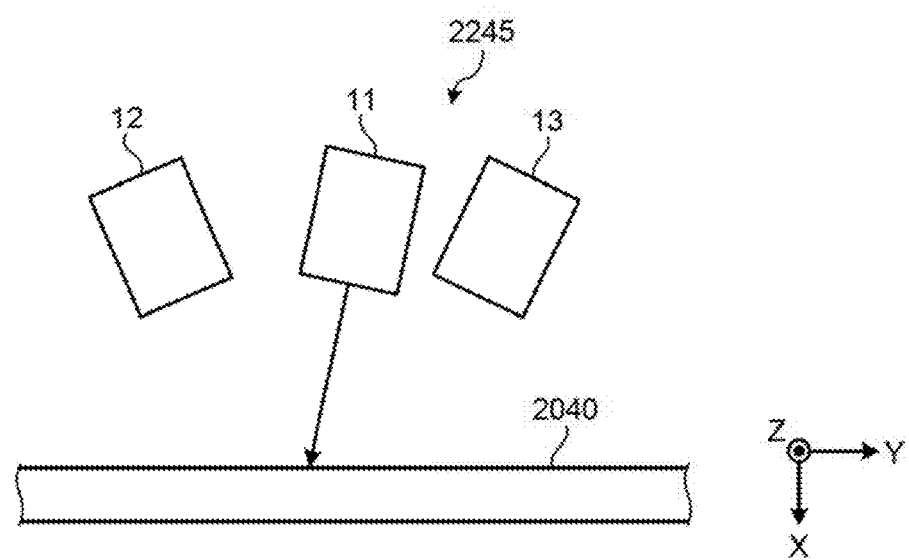
FIG. 3 is an exemplary diagram illustrating a configuration of an optical sensor.

FIG. 3 is an exemplary diagram illustrating a configuration of the optical sensors (2245a, 2245b, 2245c). As illustrated in FIG. 3, each of the optical sensors (2245a, 2245b, 2245c) includes a light emitting diode (LED) 11 that emits light (hereinafter, referred to as "detection light" also) toward the transfer belt 2040, a specular-reflection-light receiving device 12 that receives specular reflection light from the transfer belt 2040 or a toner pad on the transfer belt 2040, and a diffuse-reflection-light receiving device 13 that receives diffuse reflection light from the transfer bel 2040 or the toner pad on the transfer belt 2040. Each of the optical sensors (2245a, 2245b, 2245c) outputs a signal (photoelectric conversion signal) according to an amount of reception light.

The home position sensor 2246a detects a home position in rotation of the photoconductor drum 2030a. The home position sensor 2246b detects a home position in rotation of the photoconductor drum 2030b. The home position sensor 2246c detects a home position in rotation of the photoconductor drum 2030c. The home position sensor 2246d detects a home position in rotation of the photoconductor drum 2030d.

Next, a configuration of the optical scanning device 2010 is explained.

Figure 4:
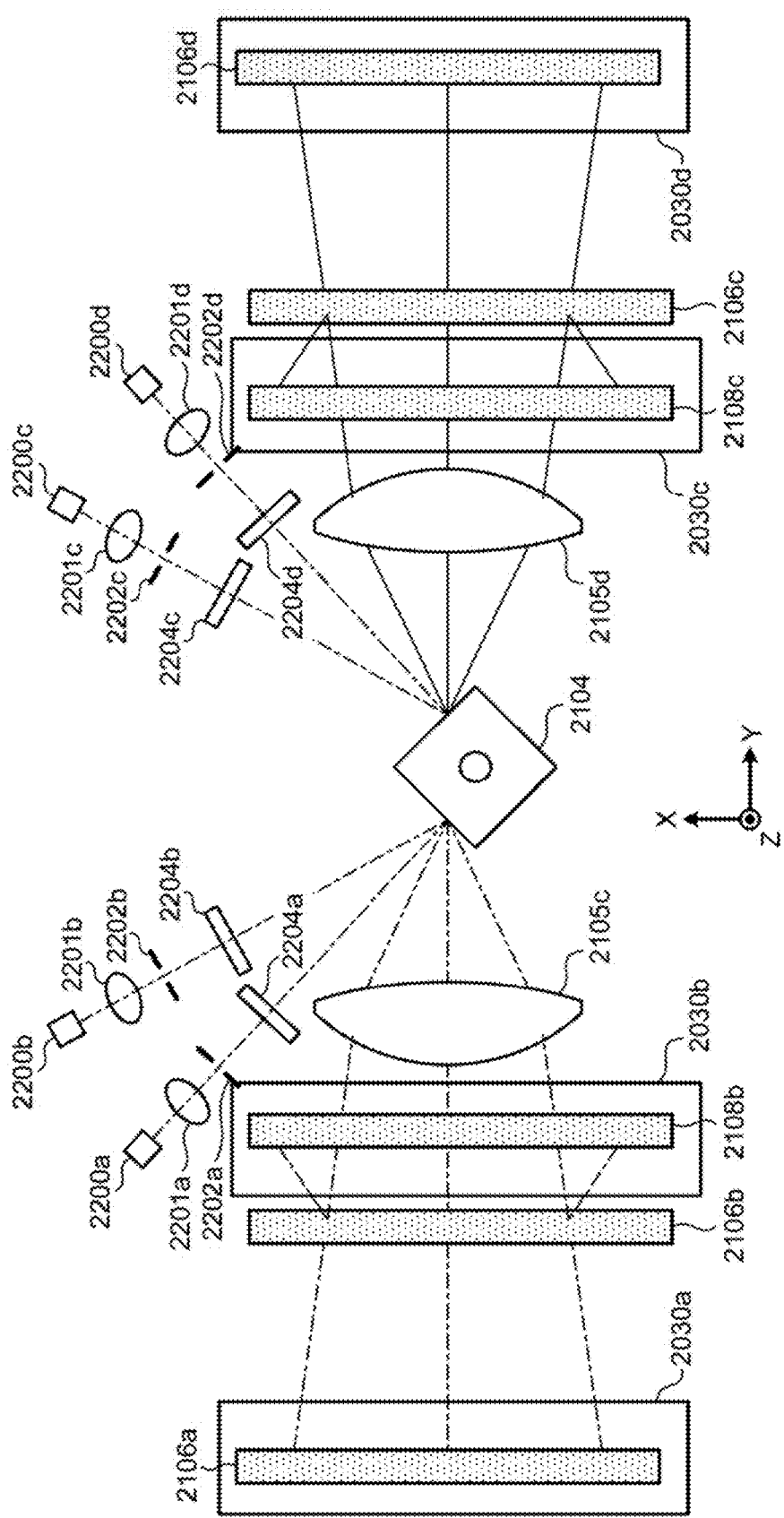
FIG. 4 is a plan view schematically illustrating a configuration of an optical scanning device.
Figure 5:
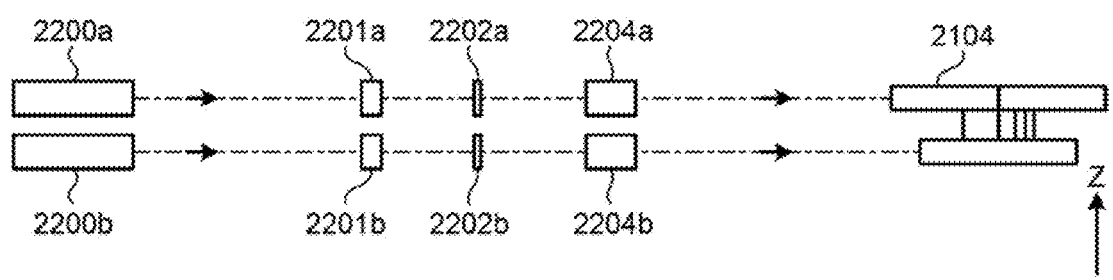
FIG. 5 is a side view partially illustrating a configuration of a laser emitting system of the optical scanning device.
Figure 6:
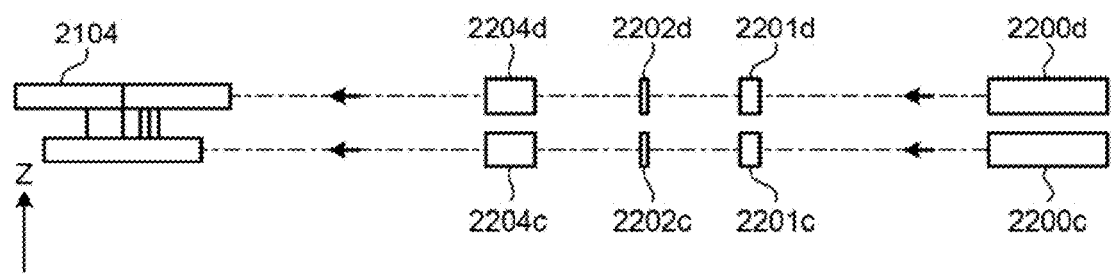
FIG. 6 is a side view partially illustrating a configuration of a laser emitting system of the optical scanning device.
Figure 7:
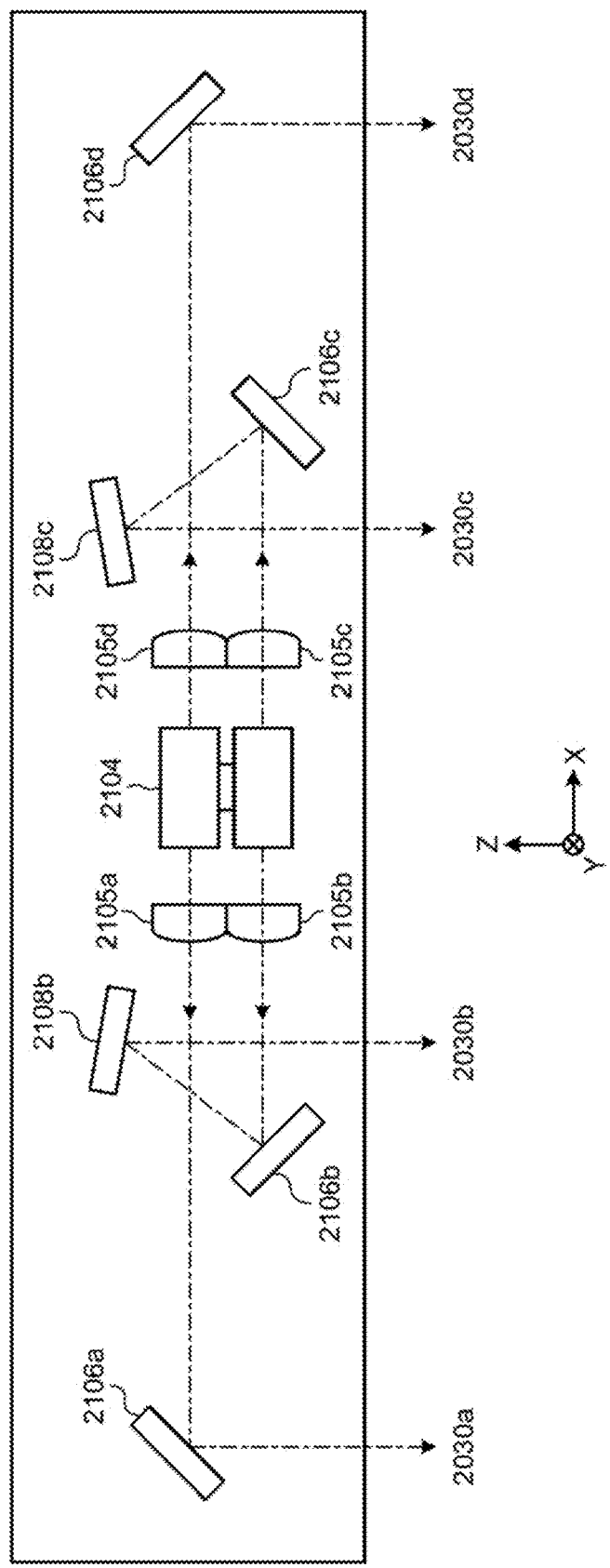
FIG. 7 is a side view partially illustrating a configuration of a scanning optical system of the optical scanning device.

FIG. 4 is a plan view schematically illustrating the configuration of the optical scanning device 2010, FIG. 5 is a side view partially illustrating a configuration of a laser emitting system of the optical scanning device 2010, FIG. 6 is a side view partially illustrating a configuration of the laser emitting system of the optical scanning device 2010, and FIG. 7 is a side view partially illustrating a configuration of a scanning optical system of the optical scanning device 2010.

As illustrated in FIG. 4 to FIG. 7 as one example, the optical scanning device 2010 includes, corresponding to the four photoconductor drums (2030a, 2030b, 2030c, 2030d), four light sources (2200a, 2200b, 2200c, 2200d), four coupling lenses (2201a, 2201b, 2201c, 2201d), four aperture plates (2202a, 2202b, 2202c, 2202d), four cylindrical lenses (2204a, 2204b, 2204c, 2204d), a polygon mirror 2104, four scanning lenses (2105a, 2105b, 2105c, 2105d), six folding mirrors (2106a, 2106b, 2106c, 2106d, 2108b, 2108c).

Each of the light sources (2200a, 2200b, 2200c, 2200d) includes a vertical cavity surface emitting laser (VCSEL) in which multiple light emitting units are two-dimensionally arranged, to achieve multibeaming. The light emitting units of the VCSEL are arranged such that gaps between the light emitting units are uniform when all of the light emitting units orthogonally project light on a virtual line that extends in directions corresponding to a sub-scanning direction. The "gap between light emitting unit" is a distance between centers of two units of the light emitting units.

The coupling lens 2201a is arranged on an optical path of light beams that are emitted from the light source 2200a, and makes the light beams into substantially parallel beams. The coupling lens 2201b is arranged on an optical path of light beams that are emitted from the light source 2200d, and makes the light beams into substantially parallel beams.

The aperture plate 2202a has an opening, and shapes a light beam through the coupling lens 2201a. The aperture plate 2202b has an opening, and shapes a light beam through the coupling lens 2201b. The aperture plate 2202c has an opening, and shapes a light beam through the coupling lens 2201c. The aperture plate 2202d has an opening, and shapes a light beam through the coupling lens 2201d.

The cylindrical lens 2204a forms an image near a deflection reflective surface of the polygon mirror 2104 about a Z-axis direction with a light beam that has passed through the opening of the aperture plate 2202a. The cylindrical lens 2204b forms an image near the deflection reflective surface of the polygon mirror 2104 about the Z-axis direction with a light beam that has passed through the opening of the aperture plate 2202b. The cylindrical lens 2204c forms an image near the deflection reflective surface of the polygon mirror 2104 about the Z-axis direction with a light beam that has passed through the opening of the aperture plate 2202c. The cylindrical lens 2204d forms an image near the deflection reflective surface of the polygon mirror 2104 about the Z-axis direction with a light beam that has passed through the opening of the aperture plate 2202d.

An optical system constituted of the coupling lens 2201a, the aperture plate 2202a, and the cylindrical lens 2204a is a pre-deflector optical system of the K station 2201a. An optical system constituted of the coupling lens 2201b, the aperture plate 2202b, and the cylindrical lens 2204b is a pre-deflector optical system of the C station 2201b. An optical system constituted of the coupling lens 2201c, the aperture plate 2202c, and the cylindrical lens 2204c is a pre-deflector optical system of the M station 2201c. An optical system constituted of the coupling lens 2201d, the aperture plate 2202d, and the cylindrical lens 2204d is a pre-deflector optical system of the Y station 2201d.

The polygon mirror 2104 has a four-sided mirror with a two-layer structure that rotates about an axis parallel to a Z axis, and each mirror serves as a deflection reflective surface. It is arranged such that the four-sided mirror on a first layer (lower layer) deflects a light beam from the cylindrical lens 2204b and a light beam from the cylindrical lens 2204c, and the four-sided mirror on a second layer (upper layer) deflects a light beam from the cylindrical lens 2204a and a light beam from the cylindrical lens 2204d.

Moreover, light beams from the cylindrical lens 2204a and the cylindrical lens 2204b are deflected to a −X side of the polygon mirror 2104, and light beams from the cylindrical lens 2204c and the cylindrical lens 2204d are deflected to a +X side of the polygon mirror 2104.

The scanning lenses (2105a, 2105b, 2105c, 2105d) have an optical power that gathers laser beams near the respective photoconductor drums (2030a, 2030b, 2030c, 2030d), and an optical power that a light spot moves at regular speed in the main scanning direction on a surface of the respective photoconductor drums (2030a, 2030b, 2030c, 2030d).

The scanning lens 2105a and the scanning lens 2105b are arranged on the −X side of the polygon mirror 2104, and the scanning lens 2105c and the scanning lens 2105d are arranged on the +X side of the polygon mirror 2104. Furthermore, the scanning lens 2105a and the scanning lens 2105b are layered in the Z-axis direction, the scanning lens 2105b is opposed to the four-sided mirror on the first layer, and the scanning lens 2105a is opposed to the four-sided mirror on the second layer. Moreover, the scanning lens 2105c and the scanning lens 2105d are layered in the Z-axis direction, the scanning lens 2105c is opposed to the four-sided mirror on the first layer, and the scanning lens 2105d is opposed to the four-sided mirror on the second layer.

The light beam from the cylindrical lens 2204a deflected by the polygon mirror 2104 is emitted onto the photoconductor drum 2030a through the scanning lens 2105a and the folding mirror 2106a, and a light spot is formed. This light spot moves in a longitudinal direction of the photoconductor drum 2030a with rotation of the polygon mirror 2104, that is, scans on the photoconductor drum 2030a. The moving direction of the light spot is the "main scanning direction" of the photoconductor drum 2030a, and the rotating direction of the photoconductor drum 2030a is the "sub-scanning direction" of the photoconductor drum 2030a.

Furthermore, the light beam from the cylindrical lens 2204b deflected by the polygon mirror 2104 is emitted onto the photoconductor drum 2030b through the scanning lens 2105b, the folding mirror 2106b, and the folding mirror 2108b, and a light spot is formed. This light spot moves in a longitudinal direction of the photoconductor drum 2030b with rotation of the polygon mirror 2104, that is, scans on the photoconductor drum 2030b. The moving direction of the light spot is the "main scanning direction" of the photoconductor drum 2030b, and the rotating direction of the photoconductor drum 2030b is the "sub-scanning direction" of the photoconductor drum 2030b.

Moreover, the light beam from the cylindrical lens 2204c deflected by the polygon mirror 2104 is emitted onto the photoconductor drum 2030c through the scanning lens 2105c, the folding mirror 2106c, and the folding mirror 2108c, and a light spot is formed. This light spot moves in a longitudinal direction of the photoconductor drum 2030c with rotation of the polygon mirror 2104, that is, scans on the photoconductor drum 2030c. The moving direction of the light spot is the "main scanning direction" of the photoconductor drum 2030c, and the rotating direction of the photoconductor drum 2030c is the "sub-scanning direction" of the photoconductor drum 2030c.

Furthermore, the light beam from the cylindrical lens 2204d deflected by the polygon mirror 2104 is emitted onto the photoconductor drum 2030d through the scanning lens 2105d and the folding mirror 2106d, and a light spot is formed. This light spot moves in a longitudinal direction of the photoconductor drum 2030d with rotation of the polygon mirror 2104, that is, scans on the photoconductor drum 2030d. The moving direction of the light spot is the "main scanning direction" of the photoconductor drum 2030d, and the rotating direction of the photoconductor drum 2030d is the "sub-scanning direction" of the photoconductor drum 2030d.

The folding mirrors (2106a, 2106b, 2106c, 2106d, 2108b, 2108c) are arranged such that optical paths from the polygon mirror 2104 to the respective photoconductor drums (2030a, 2030*b*, 2030*c*, 2030*d*) coincide with each other, and incident positions and incident angles of light beams coincide with each other.

An optical system arranged on an optical path between the polygon mirror 2104 and each of the photoconductor drums (2030*a*, 2030*b*, 2030*c*, 2030*d*) is called a scanning optical system. The scanning lens 2105*a* and the folding mirror 2106*a* constitutes a scanning optical system of the K station 2001*a*. Moreover, the scanning lens 2105*b* and the two folding mirrors (2106*b*, 2108*b*) constitutes a scanning optical system of the C station 2001*b*. Furthermore, the scanning lens 2105*c* and the two folding mirrors (2106*c*, 2108*c*) constitutes the scanning optical system of the M station 2001*c*. Moreover, the scanning lens 105*d* and the folding mirror 2106*d* constitutes the scanning optical system of the Y station 2001*d*. In each scanning optical system, the scanning lens may be constituted of multiple lenses.

Next, a control system that controls the optical scanning device 2010 is explained.

Figure 8:
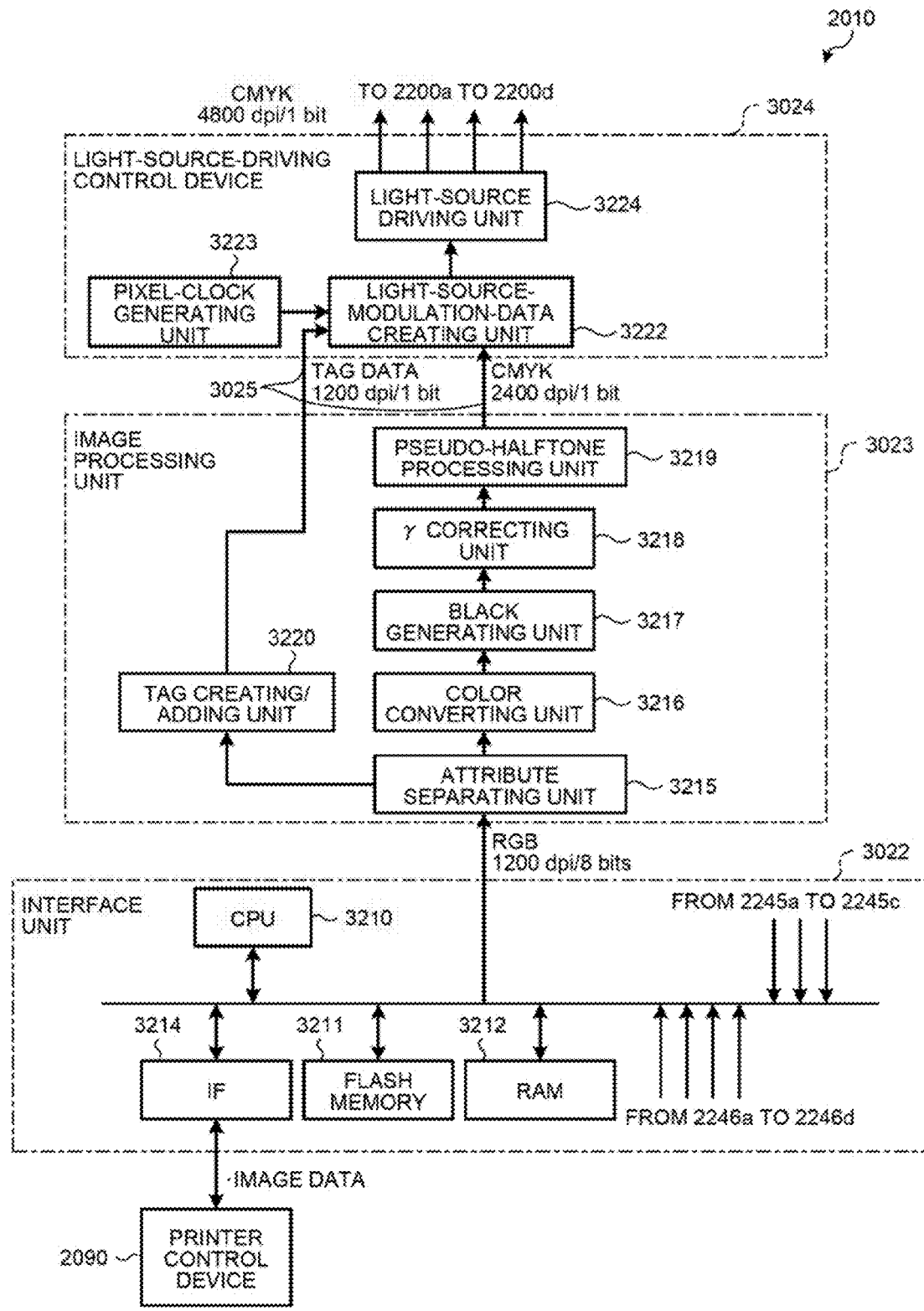
FIG. 8 is a block diagram exemplary illustrating a control system that controls the optical scanning device.

FIG. 8 is a block diagram exemplary illustrating the control system that controls the optical scanning device 2010. As illustrated in FIG. 8, the optical scanning device 2010 includes an interface unit 3022, an image processing unit (IPU) 3023, and a light-source-driving control device 3024. The image processing unit 3023 functions as an image processing unit that subjects input image data that is multibit data with a high resolution, for example, of 1200 dpi to various kinds of image processing (first image processing).

The interface unit 3022 acquires, from the printer control device 2090, image data that is transferred from a higher level device (for example, a computer). The interface unit 3022 transfers the acquired image data to the image processing unit 3023 at a later stage.

The interface unit 3022 includes, as illustrated in FIG. 8, a CPU 3210, a flash memory 3211, a RAM 3212, and an interface (IF) 3214. Arrows in FIG. 8 indicate flows of representative signals and information, but not entire connection relationship of the blocks.

The IF 3214 is a communication interface that controls bidirectional communication with the printer control device 2090. Image data from a higher level device is provided through the IF 3214. In the present embodiment, the image data provided from a higher level device is 8-bit image data in an RGB format with a resolution of 1200 dpi.

The flash memory 3211 stores therein various kinds of programs that are described in a code readable by the CPU 3210 and various kinds of data that is necessary for executing the programs. The RAM 3212 is a work memory.

The CPU 3210 operates according to a program stored in the flash memory 3211, and controls the entire optical scanning device 2010. The interface unit 3022 having such a configuration transfers input image data (RGB format, 1200 dpi, 8 bits) transmitted from the printer control device 2090 to the image processing unit 3023.

The image processing unit 3023 acquires image data from the interface unit 3022, and converts into color image data compliant with a print method. As one example, the image processing unit 3023 converts image data in the RGB format into image data in a tandem format (CMYK format). Moreover, the image processing unit 3023 performs various kinds of image processing in addition to conversion of data format.

In the present embodiment, the image processing unit 3023 outputs 1-bit image data in the CMYK format with a resolution of 2400 dpi. The resolution of image data output from the image processing unit 3023 is not limited to 2400 dpi. Furthermore, the resolution of image data output from the image processing unit 3023 is referred to as a first resolution.

Moreover, the image processing unit 3023 creates tag data that indicates whether each pixel of the image data with the first resolution (2400 dpi) is a pixel constituting any of a character and a line. The image processing unit 3023 transfers the created image data with the first resolution and the tag data to the light-source-driving control device 3024.

The image processing unit 3023 includes an attribute separating unit 3215, a color converting unit 3216, a black generating unit 3217, a γ correcting unit 3218, a pseudo-halftone processing unit 3219, and a tag creating/adding unit 3220.

The attribute separating unit 3215 receives input image data (RGB format, 1200 dpi, 8 bits) from the interface unit 3022. To each pixel of the input image data, attribute information is added. The attribute information indicates a type of an object which is a source of the region (pixel). For example, when the pixel is a part of a character, an attribute of "character" is indicated in the attribute information. For example, when the pixel is a part of a line, an attribute of "line" is indicated in the attribute information. Furthermore, when the pixel is a part of a figure, an attribute of "figure" is indicated in the attribute information. Moreover, when the pixel is a part of a photograph, an attribute of "photograph" is indicated in the attribute information.

The attribute separating unit 3215 separates attribute information and image data from the input image data. Specifically, the attribute separating unit 3215 separates image data according to attributes so as to be able to perform appropriate processing determined for each attribute, such as text of a pixel constituting a character, line of a pixel constituting a line, and image of bitmap data. Furthermore, the attribute separating unit 3215 transfers the separated attribute information and image data to the tag creating/adding unit 3220. Moreover, the attribute separating unit 3215 transfers the image data to the color converting unit 3216. The image data output from the attribute separating unit 3215 is of RGB, 1200 dpi/8 bits, as one example. Furthermore, the attribute information output from the attribute separating unit 3215 is 1-bit data with a resolution (1200 dpi) same as that of the image data, as one example.

The color converting unit 3216 converts 8-bit RGB image data into 8-bit CMY image data that is in colors reproduced in a printer. The black generating unit 3217 generates black components to create image data in the CMYK format from the CMY image data created by the color converting unit 3216.

The γ correcting unit 3218 linearly converts a level of each color of the CMYK image data created by the black generating unit 3217 by using a table or the like. Specifically, the γ correcting unit 3218 performs tone correction according to output characteristics of the printer for each of CMYK.

The pseudo-halftone processing unit 3219 changes the resolution from 1200 dpi to 2400 dpi. The pseudo-halftone processing unit 3219 subjects the CMYK image data in 2400 dpi (first resolution) in which one pixel is expressed by multiple bits (8 bits in the present embodiment) to dithering, error diffusion, or the like to perform pseudo-halftone processing, thereby creating 1-bit area-coverage modulation data from the 8-bit image data. Specifically, the pseudo-halftone processing unit 3219 performs processing of changing the number of pixels or pixel values within a certain region by using binary or multiple-valued dithering matrix for each of CMYK such that continuous tones having a structure of dots or lines.

The tag creating/adding unit 3220 creates tag data that indicates whether each pixel of image data in 1200 dpi constitutes any of a character and a line. The tag creating/adding unit 3220 creates tag data based on the attribute information as one example. Specifically, the tag creating/adding unit 3220 determines a region to be subjected to processing by a light-source-modulation-data creating unit 3222, by using image data and the attribute information (text, image, line, and the like) of the image data, and adds tag data (different from the attribute information described above) to a pixel in the subject region.

In the present embodiment, the tag creating/adding unit 3220 allocates tag data indicating a character or a line to a black pixel to which the attribute information indicating a character or a line is added. The black pixel is a pixel, the pixel value of which is 1 when the number of shades of gray is reduced to 1 bit, and is a pixel for which light is emitted from the light source 2200 to the photoconductor drum 2030. Moreover, a white pixel is a pixel, the pixel value of which is 0 when the number of shades of gray is reduced to 1 bit, and is a pixel for which light is not emitted from the light source 2200 to the photoconductor drum 2030.

The tag data that is created by the tag creating/adding unit 3220 is transferred to the light-source-driving control device 3024.

The image processing unit 3023 transmits 1-bit image data with the first resolution (2400 dpi) and 1-bit tag data of 1200 dpi to the light-source-driving control device 3024.

As described, the image processing unit 3023 can create tag data associated with each pixel of image data with the first resolution (2400 dpi) to transmit to the light-source-driving control device 3024. Furthermore, the image processing unit 3023 may be implemented partially or entirely with hardware, or may be implemented by a software program executed by the CPU.

The light-source-driving control device 3024 acquires the image data with the first resolution and the tag data from the image processing unit 3023, and converts into color image data with a second resolution conforming to light source driving. The second resolution is higher than the first resolution. In the present embodiment, the light-source-driving control device 3024 converts data into 1-bit image data in the CMYK format with the resolution of 4800 dpi.

The light-source-driving control device 3024 modulates the image data with the second resolution into a clock signal that indicates light emission timing of pixels, to generate an individual modulation signal for each color. The light-source-driving control device 3024 then drives the light sources 2200a, 2200b, 2200c, and 2200d in accordance with modulation signals corresponding to the respective colors to emit light. The light-source-driving control device 3024 may perform the resolution conversion processing and the modulation processing integrally.

Furthermore, the light-source-driving control device 3024 is, for example, a single integrated device that is formed into one chip, arranged near the light sources 2200a, 2200b, 2200c, and 2200d. The image processing unit 3023 and the interface unit 3022 are arranged far from the light sources 2200a, 2200b, 2200c, and 2200d compared to the light-source-driving control device 3024. The image processing unit 3023 and the light-source-driving control device 3024 are connected by a cable 3025.

The light-source-driving control device 3024 includes the light-source-modulation-data creating unit 3222, a pixel-clock generating unit 3223, and a light-source driving unit 3224.

The pixel-clock generating unit 3223 generates a pixel clock that indicates light emission timing of pixels. The pixel clock signal is a signal to which image data is modulated at the resolution corresponding to 4800 dpi.

The light-source-modulation-data creating unit 3222 creates data to drive the light sources (2200a, 2200b, 2200c, and 2200d) of the optical scanning device 2010. The light-source-modulation-data creating unit 3222 acquires image data with the first resolution and tag data from the image processing unit 3023. The light-source-modulation-data creating unit 3222 creates image data with the second resolution that is higher than the first resolution based on the image data with the first resolution and the tag data. In the present embodiment, the light-source-modulation-data creating unit 3222 creates image data corresponding to 1-bit data in the CMYK format at 4800 dpi based on 1-bit image data in the CMYK format at 2400 dpi. The light-source-modulation-data creating unit 3222 modulates the image data with the second resolution as described into a clock signal, to create a modulation signal to form an image at 4800 dpi.

More specifically, the light-source-modulation-data creating unit 3222 divides image data that has been transferred at the first resolution in the main scanning direction and the sub-scanning direction, and converts (increase the resolution) the data into image data with the second resolution that is higher than the first resolution. Moreover, the light-source-modulation-data creating unit 3222 acquires write start timing for each image forming station 2001 (the K station 2001a, the C station 2001b, the M station 2001c, the Y station 2001d).

The light-source-modulation-data creating unit 3222 superimposes image dot data of each light emitting unit of the light sources (2200a, 2200b, 2200c, 2200d) with the pixel clock signal from the pixel-clock generating unit 3223, and creates individual modulation data for each light emitting unit based on information from the image processing unit 3023 and the like. Furthermore, the light-source-modulation-data creating unit 3222 refers to tag data and performs line thinning processing and intense exposure processing by lighting control of controlling light emission (power modulation control) of the light source 2200 as described later.

The light-source driving unit 3224 receives the light-source modulation signal according to image data with the second resolution. The light-source driving unit 3224 outputs a driving signal of each light emitting unit to each of the light sources (2200a, 2200b, 2200c, 2200d), according to each individual modulation data for each color output from the light-source-modulation-data creating unit 3222. Thus, the light-source driving unit 3224 can cause each of the light sources 2200a, 2200b, 2200c, and 2200d to emit light at a light amount in accordance with the light-source modulation signal.

Next, the light-source-modulation-data creating unit 3222 is explained in detail.

Figure 9:
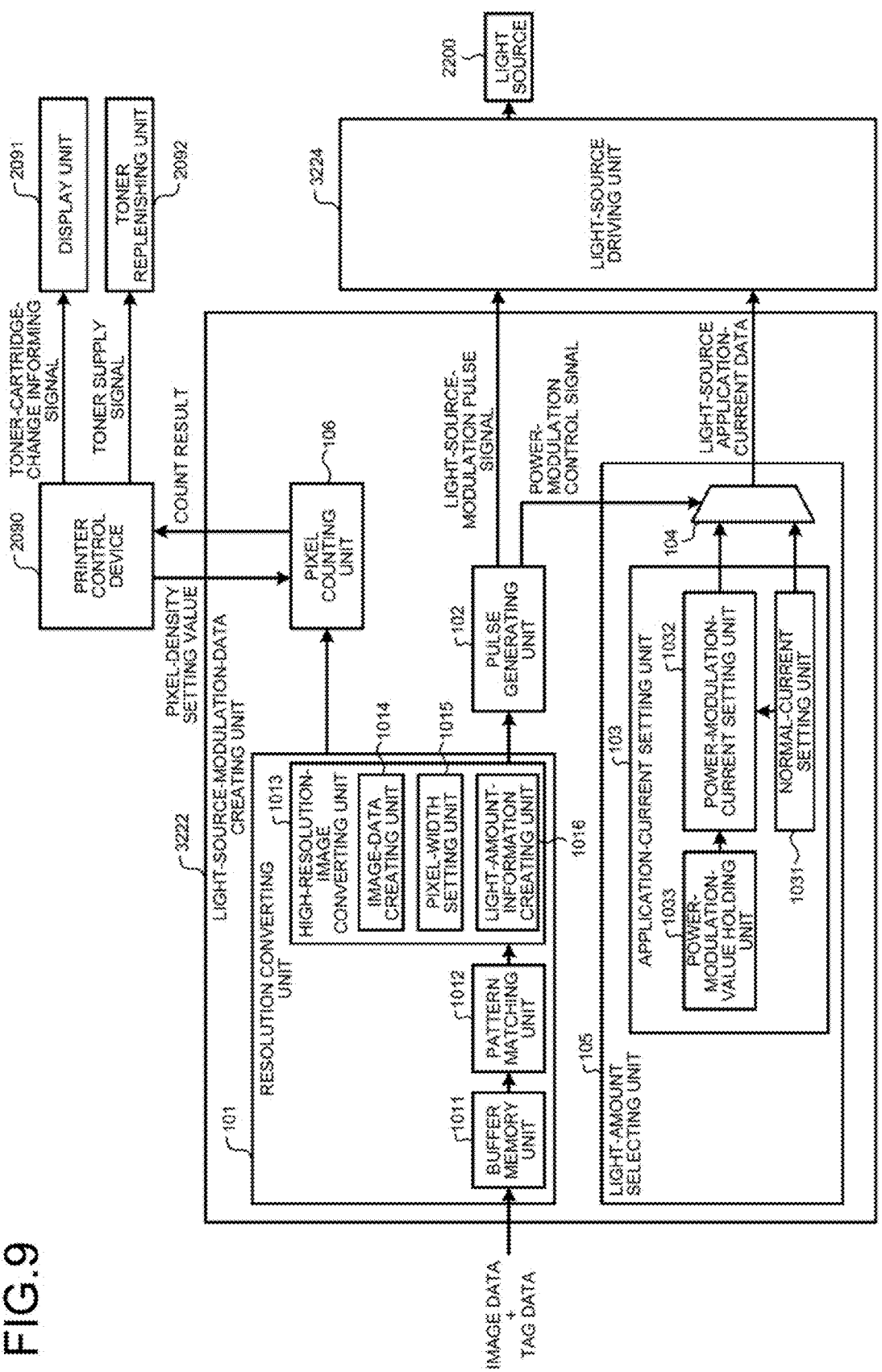
FIG. 9 is a block diagram schematically illustrating a configuration of a light-source modulation-data generating unit.

FIG. 9 is a block diagram schematically illustrating a configuration of the light-source modulation-data generating unit 3222. As illustrated in FIG. 9, the light-source modulation-data generating unit 3222 includes a resolution converting unit 101, a pulse generating unit 102, an application-current setting unit 103, and a pixel counting unit 106. That is, the light-source-modulation-data creating unit 3222 (the resolution converting unit 101, the pulse generating unit 102, the application-current setting unit 103, the pixel counting unit 106) and the light-source driving unit 3224 are integrated in a single integrated device as the light-source-driving control device 3024.

The resolution converting unit 101 sequentially selects a subject pixel from image data (image data with the first resolution) based on the image data (image data with the first resolution) output from the image processing unit 3023 and arrangement of the tag data, and converts the image data with the first resolution into image data with higher resolution (image data with the second resolution) when the subject pixel sequentially selected is a pixel constituting an edge (end, contour) of an image, such as a thin line, to perform the thinning processing (second image processing). Furthermore, the resolution converting unit 101 changes, at the thinning processing, the degree of thinning according to a width of a thin line before the processing. The pulse generating unit 102 generates a light-source-modulation pulse signal and a power-modulation control signal which is an application-current switching signal. The application-current setting unit 103 sets a current amount to be applied to each of the light sources (2200*a*, 2200*b*, 2200*c*, 2200*d*).

The resolution converting unit 101 is explained in detail.

The resolution converting unit 101 includes a buffer memory unit 1011, a pattern matching unit 1012, and a high-resolution-image converting unit 1013 being an image converting unit. The buffer memory unit 1011 acquires image data in a region including a subject pixel and pixels around the subject pixel, and an image matrix which is tag data. The pattern matching unit 1012 determines whether the subject pixel is a pixel constituting an edge (end, contour) of an image, such as a thin line, based on the image data (image data with the first resolution) in the image matrix and the arrangement of the tag data. The high-resolution-image converting unit 1013 converts data into high resolution image data (image data with the second resolution) in a pattern determined corresponding to an output of the pattern matching unit 1012.

The buffer memory unit 1011 receives data of 2400 dpi/1 bit that is transmitted from the image processing unit 3023, and accumulates it as much as multiple main scanning lines. The buffer memory unit 1011 passes accumulated data to a downstream side in response to reading from a data processing unit (the pattern matching unit 1012 herein) on the downstream side. At this stage, the image data is described in a 2400 dpi/1 bit signal. An output from the buffer memory unit 1011 is input to the pattern matching unit 1012.

The pattern matching unit 1012 determines whether the subject pixel is a pixel constituting any of a thin line and a character based on the image data in the image matrix and the arrangement of the tag data. Specifically, the pattern matching unit 1012 subjects a signal corresponding to, for example, a 2400 dpi/1 bit image dot to pattern detection to detect a pixel to be subjected to an image processing by using the image matrix described later. At this time, when tag data indicating the attribute of the image data is available, the pattern matching unit 1012 performs pattern matching on an image region that is determined as necessary from the attribute of the image, and performs detection. The attribute of an image is, for example, character, photograph, figure, and the like. Thereafter, the pattern matching unit 1012 outputs a signal indicating the pattern information to the high-resolution-image converting unit 1013.

The high-resolution-image converting unit 1013 includes an image-data creating unit 1014, a pixel-width setting unit 1015, and a light-amount-information creating unit 1016.

The image data creating unit 1014 creates thin-lined image data that is obtained by performing the thinning processing of thinning a pixel at an edge portion of the image data by a first pixel width. The first pixel width is described in detail later.

Furthermore, the image-data creating unit 1014 sequentially selects a subject pixel from the image data with the first resolution, and converts the image data into high resolution image data per subject pixel. Specifically, the image-data creating unit 1014 performs resolution conversion processing of converting into high resolution image data in a pattern determined corresponding to an output of the pattern matching unit 1012. More specifically, the image-data creating unit 1014 increases the resolution of a pixel detected by the pattern matching, for example, by converting image data of 2400 dpi/4 bits into image data of 4800 dpi/1 bit, to divide into 2×2 regions. The image-data creating unit 1014 then sets image dot based on matched pattern information for each image section obtained by dividing pixels, thereby creating image data (thin-lined image data) having been subjected to the thinning processing.

Namely, the image-data creating unit 1014 sequentially selects a subject pixel from the input image data with the first resolution, and converts the image data with the first resolution into image data with the second resolution that is higher than the first resolution, and creates thin-lined image data obtained by performing the thinning processing.

The pixel-width setting unit 1015 sets a second pixel width of an edge portion of the thin-lined image data created by the image-data creating unit 1014 such that a ratio between a first pixel width and the second pixel width is uniform. Details of the first pixel width and the second pixel width are described later. The first pixel width and the second pixel width may be set in advance.

Furthermore, the pixel-width setting unit 1015 sets the ratio between the first pixel width and the second pixel width to 1 to 1 when a second light amount (large light amount) is twice as much as a first light amount (normal light amount). Moreover, the pixel-width setting unit 1015 sets the ratio between the first pixel width and the second pixel width to 1 to 2, when the second light amount (large light amount) is 1.5 times as much as the first light amount (normal light amount).

Furthermore, the pixel-width setting unit 1015 sets the ratio between the first pixel width and the second pixel width according to a proportion of the second light amount to the first light amount.

The pixel-width setting unit 1015 outputs a data-width setting signal created based on the second pixel width to the pixel counting unit 106.

The light-amount-information creating unit 1016 creates light amount information that includes the first light amount (normal light amount) to expose a pixel not included in the second pixel width set by the pixel-width setting unit 1015 and the second light amount (large light amount) that is larger than the first light amount, to expose a pixel included in the second pixel width. The second light amount (large light amount) has multiple light amount levels. For example, when the first light amount (normal light amount) is 100%, the second light amount (large light amount) is higher than 100%, and for example, 125%, 150%, 200%, 250%, 300%, or the like.

Moreover, the light-amount-information creating unit 1016 creates power modulation information (power-modulation control signal).

Furthermore, the light-amount-information creating unit 1016 creates the light amount information such that the total amount of light exposing all pixels of image data before subjected to the thinning processing with the first light amount (normal light amount) is equal to a sum of the total amount of light exposing all pixels not included in the second pixel width with the first light amount (normal light amount) and the total amount of light exposing all pixels included in the second pixel width with the second light amount (large light amount).

Moreover, the light-amount-information creating unit 1016 creates the light amount information such that rate of the second light amount (large light amount) to the first light amount (normal light amount) is higher than or equal to one time, and lower than three times, and more preferably, is in a range from 1.5 times to 2 time.

The light-amount-information creating unit 1016 outputs a light-mount setting signal based on the created light amount information to the pixel counting unit 106.

The high-resolution-image converting unit 1013 outputs created image data (thin-lined image data) and power modulation information to the pulse generating unit 102.

The pulse generating unit 102 subjects the image data and the power modulation information to serial conversion based on a high frequency clock (basic clock to generate a pulse signal), and outputs them as a light-modulation pulse signal (on/off modulation signal) and a power-modulation control signal (application-current switching signal). The pulse signal is a serial signal, and an H period and an L period of the signal indicate on and off and switching timing as they are. The pulse generating unit 102 outputs the light-modulation pulse signal to the light-source driving unit 3224. Moreover, the pulse generating unit 102 outputs the power-modulation control signal to a current data selector 104. The power-modulation control signal serves as a switching signal to select a normal light-amount data and a large light-amount data described later in the current data selector 104. In this example, the H period of the pulse signal indicates a large light-amount period, and the L period of the pulse signal indicates a normal light-amount period.

Next, the application-current setting unit 103 is explained in detail.

The application-current setting unit 103 includes a normal-current setting unit 1031, a power-modulation-current setting unit 1032, and a power-modulation-value holding unit 1033. The application-current setting unit 103 outputs current setting values that are switched according to the power-modulation control signal (application-current switching signal) generated by the pulse generating unit 102, and that are applied to the light sources (2200a, 2200b, 2200c, 2200d). More specifically, the application-current setting unit 103 performs the intense exposure processing that is application current modulation (power modulation) to change the exposure intensity for a thin line to be a subject of the thinning processing.

The normal-current setting unit 1031 creates first light-amount (normal light amount) data. The power-modulation-value holding unit 1033 holds a variable magnification (power modulation value) at the power-modulation-current setting unit 1032 that varies the magnification of the first light-amount data (normal light amount) to acquire the second light-amount (large light amount) data. The power-modulation-current setting unit 1032 refers to the variable magnitude (power modulation value) held by the power-modulation-value holding unit 1033 to vary the magnitude of the first light-source (normal light source) data, to set the second light-amount (large light amount) data. The normal light-amount data created by the normal-current setting unit 1031 and the large light-amount data created by the power-modulation-current setting unit 1032 are output to the current data selector 104.

The current data selector 104 selects either one out of the current setting values (the normal light-amount data and the large light-amount data) output from the application-current setting unit 103, based on the power-modulation control signal from the pulse generating unit 102. The current data selector 104 outputs the selected light amount data to the light-source driving unit 3224 as light-source application current data.

That is, the application-current setting unit 103 and the current data selector 104 constitutes a light-amount selecting unit 105 that selects either one of the first light amount (normal light amount) and the second light amount (large light amount) that is used when performing the intense exposure processing, as the light-source application current data based on the power-modulation control signal generated by the pulse generating unit 102.

The light-source driving unit 3224 drives each of the light sources (2200a, 2200b, 2200c, 2200d) according to the light-source application current data from the current data selector 104 and the light-source modulation pulse signal (on/off modulation signal) from the pulse generating unit 102.

Here, the light-source driving unit 3224 that receives the light-source modulation pulse signal and the light-source application current data and drives the light sources (2200a, 2200b, 2200c, 2200d) is explained in detail.

Figure 10:
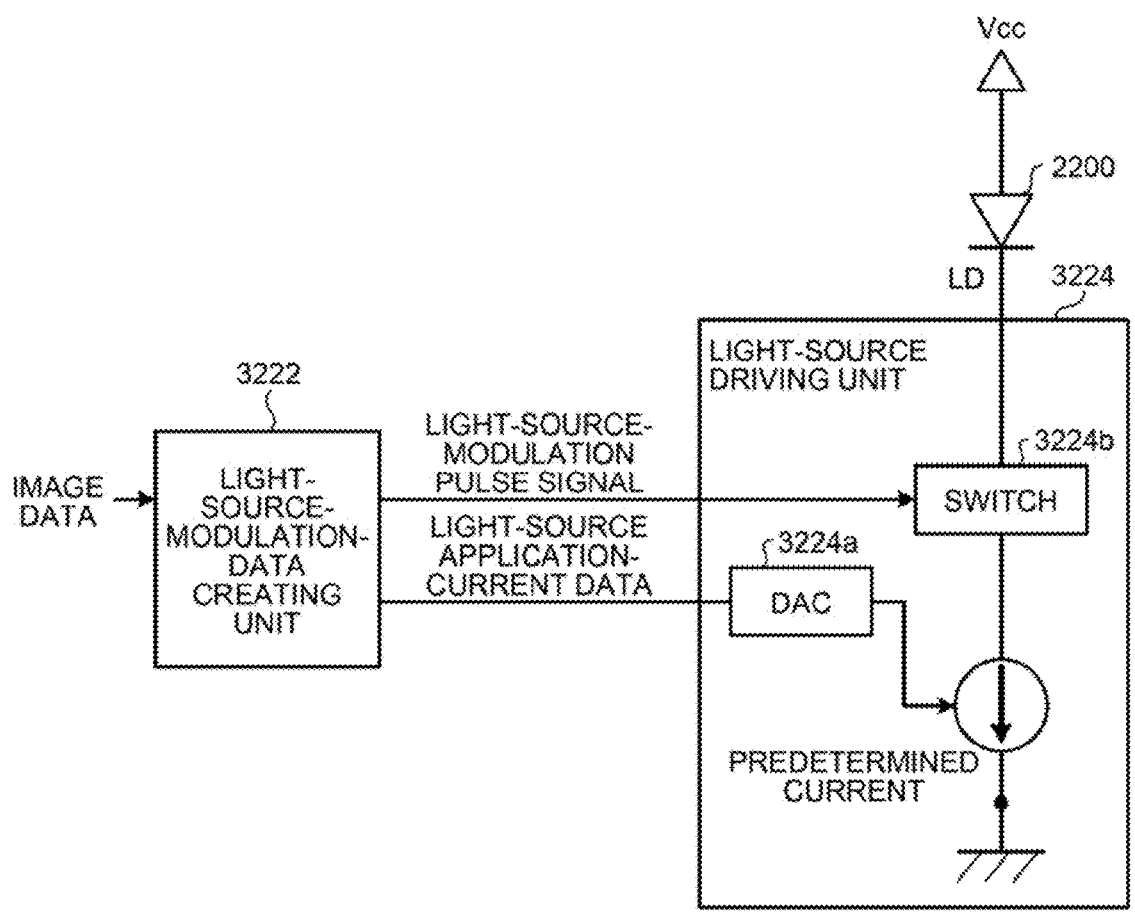
FIG. 10 is a block diagram schematically illustrating a configuration example of a light-source driving unit.

FIG. 10 is a block diagram schematically illustrating a configuration example of the light-source driving unit 3224. Note that although the light source is illustrated as a single laser diode (LD) in FIG. 10 for simplicity of explanation, the same applies to a case of the light source being an LDA or a VCSEL in the actual situation.

As illustrated in FIG. 10, the light-source driving unit 3224 includes a current source that flows an electric current in a forward direction of light sources based on the light-source modulation pulse signal and the light-source application current data to the LD of the light sources (2200a, 2200b, 2200c, 2200d). The light-source application current data is configured to be set digitally by a digital-to-analog converter (DAC) code 3224a. Moreover, a switch 3224b controls light emission of the light sources (2200a, 2200b, 2200c, 2200d) in a desirable lighting pattern by controlling on/off of the current source based on the light-source modulation pulse signal.

Figure 11:
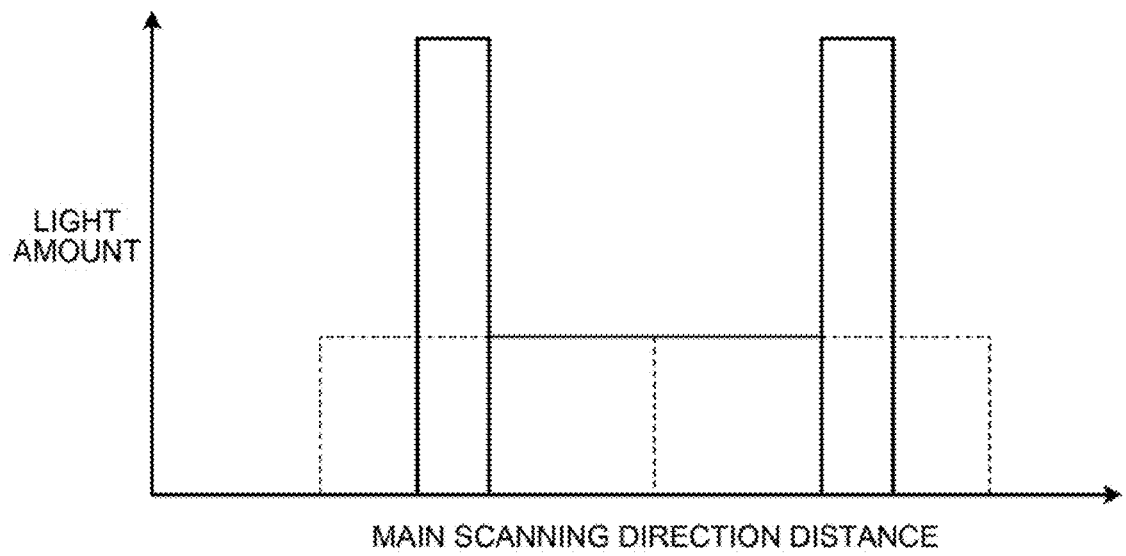
FIG. 11 is a graph illustrating an optical waveform of an example of light emission control in the light-source driving unit.
Figure 12:
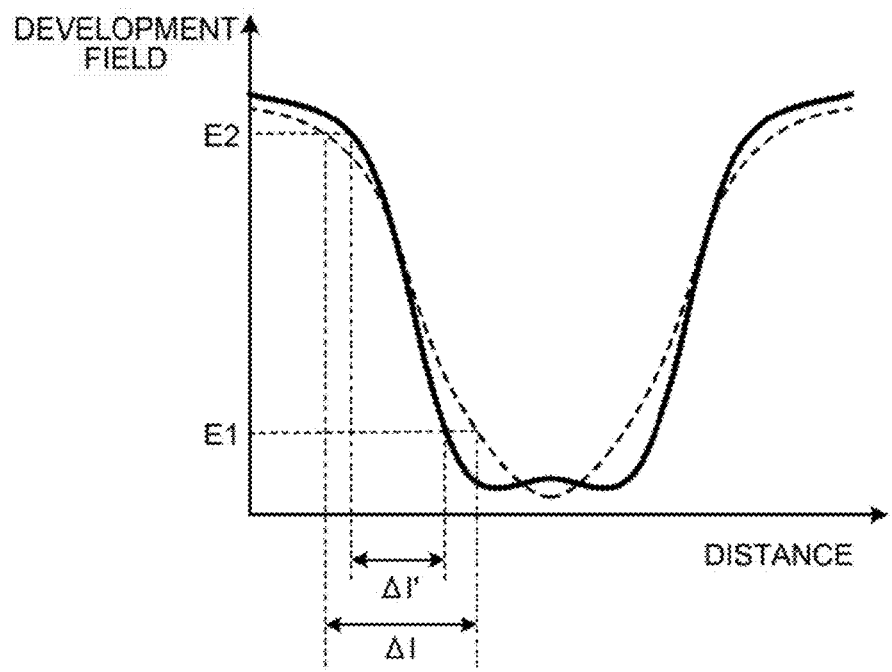
FIG. 12 is a graph of a development field according to the optical waveform illustrated in FIG. 11.

FIG. 11 is a graph illustrating an optical waveform of an example of light emission control in the light-source driving unit 3224, and FIG. 12 is a graph of a development field according to the optical waveform illustrated in FIG. 11. The optical waveform of the light-source driving unit 3224 illustrated in FIG. 11 is obtained by performing, when tag data is added by the tag creating/adding unit 3220 of the image processing unit 3023, the thinning processing and the intense exposure processing in the light-source-modulation-data creating unit 3222 on a pixel (an edge portion in this example) in a subject region of the tag data. That is, in the optical waveform illustrated in FIG. 11, a light amount at an edge portion is increased from a predetermined light amount. The optical wave form indicated by a dotted line in FIG. 11 indicates an optical waveform of an ordinary scheme. Moreover, the development field indicated by a dotted line indicates a development field according to the optical waveform of an ordinary scheme.

By increasing the light amount at the edge portion to have an optical waveform as illustrated in FIG. 11, an abrupt change can be caused in the development field as illustrated in FIG. 12. More specifically, as illustrated in FIG. 12, as a weak field region (region between E1 and E2) in which toner adhesion is unstable is Δl' (<Δl), the region in which toner adhesion is unstable can be reduced from a conventional case.

As a result, unevenness in toner adhesion can be reduced, and effects of improving density stability of a printed material and improving sharpness of a line at an edge are produced. In addition, as the pulse width is narrowed, the total amount of exposure energy does not increase significantly, and the appropriate exposure energy can be maintained.

Figure 13:
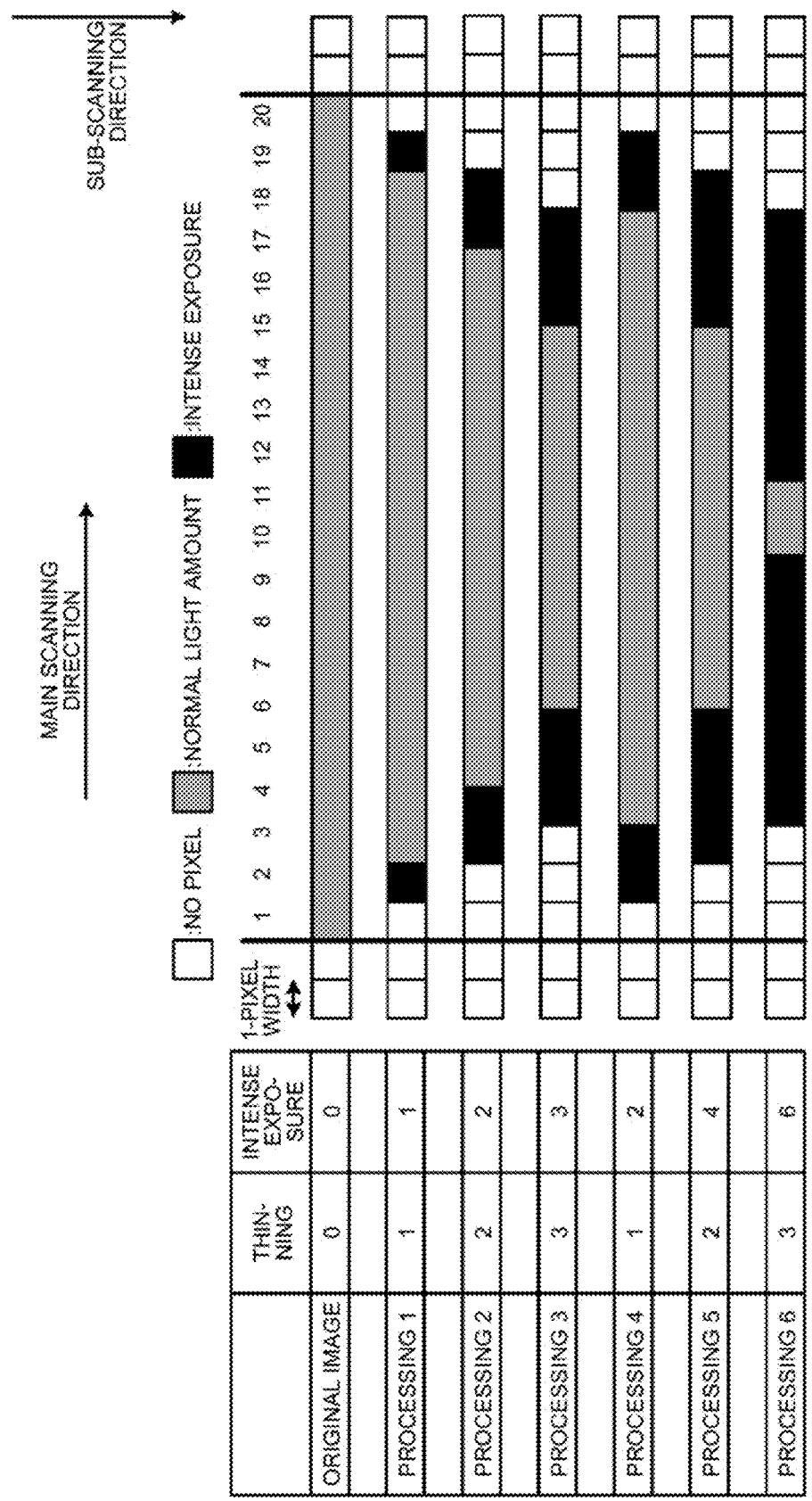
FIG. 13 is an explanatory diagram of a pixel width of a pixel to be a thin line and a pixel width of a pixel to be exposed intensely.

An example of light emission control of the light-source driving unit 3224 is explained. FIG. 13 is an explanatory diagram of a pixel width of a pixel to be a thin line and a pixel width of a pixel to be exposed intensely.

The light-source driving unit 3224 drives (outputs a driving signal) the light sources (2200*a*, 2200*b*, 2200*c*, 2200*d*) based on the light-source modulation signal from the pulse generating unit 102 and drive current data (light-source application current data) from the application-current setting unit 103. Specifically, the light-source driving unit 3224 sets the light-source modulation signal to control light emission of the light sources (2200*a*, 2200*b*, 2200*c*, 2200*d*), for example, according to thin-lined image data subjected to the thinning processing to thin a pixel at an edge portion in line data and character data included in input image data by the first pixel width, and the second pixel width of an edge portion in the thin-lined image data, such that the ratio between the first pixel width and the second pixel width is constant. The light-source driving unit 3224 controls light emission of the light sources (2200*a*, 2200*b*, 2200*c*, 2200*d*) based on a drive-current switching signal corresponding to the light amount information. The light amount information includes the first light amount (normal light amount) at which a pixel not included in the set second pixel width is exposed and the second light amount (large light amount) larger than the first light amount, at which a pixel included in the second pixel width is exposed. A ratio between a drive current to emit light at the first light amount and a drive current to emit light at the second light amount is preferable to be in a range between 1 to 1.5 and 1 to 2.

A rectangle illustrated in FIG. 13 indicates one pixel. A horizontal direction of an image indicates the main scanning direction of the optical scanning device 2010, and a vertical direction of the image indicates the sub-scanning direction. The size of one pixel in each of the main scanning direction and the sub-scanning direction corresponds to, for example, in a production printing apparatus, 1200 dpi, 2400 dpi, or 4800 dpi.

For example, the first row illustrated in FIG. 13 corresponds to an original image and represents a model that a horizontal one-pixel line in the main scanning direction is extracted from a vertical line image extending in the sub-scanning direction. The example in FIG. 13 illustrates a model that a one-pixel line in the main scanning direction is extracted from a vertical line image extending in the sub-scanning direction and having 20 pixels of the pixel width in the main scanning direction. A white rectangle indicates absence of pixel, and a gray rectangle indicates that the exposure light amount of a pixel is a normal light amount, and a black rectangle of a pixel indicates that the exposure light amount is the intense light amount (large light amount). That is, the original image on the first row represents image data in which 20 pixels (dots) to be exposed at the ordinary light amount are arranged at positions indicated by 1 to 20.

The ordinary light amount is a light amount when the intense exposure processing is off, and for example, when the normal light amount is 100%, the light amount of the intense exposure (large light amount) is larger than 100%, and for example, is 125%, 150%, 200%, 250%, 300%, and the like.

Furthermore, numeric values indicated in a line of thinning and intense exposure indicate pixel widths (number of pixels). Specifically, the numeric values indicate a pixel width (number of pixels) to be subjected to the thinning processing and a pixel width (number of pixels) to be subjected to the intense exposure processing after the thinning processing. For example, in processing 1 on the second row, it is indicated that the pixel width to be subjected to the thinning processing is 1 pixel, and the pixel width to be subjected to the intense exposure processing is 1 pixel. Moreover, in processing 2 on the third row, it is indicated that the pixel width to be subjected to the thinning processing is 2 pixels, and the pixel width to be subjected to the intense exposure processing is 2 pixels. Furthermore, in processing 3 on the fourth row, it is indicated that the pixel width to be subjected to the thinning processing is 3 pixels, and the pixel width to be subjected to the intense exposure processing is 3 pixels. Moreover, in processing 4 on the fifth row, it is indicated that the pixel width to be subjected to the thinning processing is 1 pixel, and the pixel width to be subjected to the intense exposure processing is 2 pixels. Furthermore, in processing 5 on the sixth row, it is indicated that the pixel width to be subjected to the thinning processing is 2 pixels, and the pixel width to be subjected to the intense exposure processing is 4 pixels. Moreover, in processing 6 on the seventh row, it is indicated that the pixel width to be subjected to the thinning processing is 3 pixels, and the pixel width to be subjected to the intense exposure processing is 6 pixels. Hereinafter, for example, the pixel width being 3 pixels is expressed as "3-pixel width".

Referring to FIG. 13, processing 1 to 6 in which the thinning processing and the intense exposure processing are performed at the same time in the present embodiment are explained. First, the thinning processing is image processing of thinning a pixel at an edge portion of input original image data by the first pixel width, and the first pixel width is set to any width. In FIG. 13, processing in which the thinning processing and the intense exposure processing are performed at the same time is simply expressed as "Processing".

In Processing 1, the thinning processing of changing the light amount from the normal light amount to a light-off state for 1 pixel at the edge portion of the image data, on pixels having 20-pixel width in the main scanning direction is performed. Furthermore, in Processing 1, an example of performing the intense exposure processing of changing the light amount to intense exposure light having larger light amount than the normal light amount for 1 pixel at an edge portion in the thin-line image data that is newly created by the thinning processing is indicated.

In Processing 2, the thinning processing of changing the light amount from the normal light amount to the light-off state for 2 pixels at the edge portion of the image data, on pixels having 20-pixel width in the main scanning direction is performed. Furthermore, in Processing 2, an example of performing the intense exposure processing of changing the light amount to intense exposure light having larger light amount than the normal light amount for 2 pixels at an edge portion in the thin-line image data that is newly created by the thinning processing is indicated.

In Processing 3, the thinning processing of changing the light amount from the normal light amount to the light-off state for 3 pixels at the edge portion of the image data, on pixels having 20-pixel width in the main scanning direction is performed. Furthermore, in Processing 3, an example of performing the intense exposure processing of changing the light amount to intense exposure light having larger light amount than the normal light amount for 3 pixels at an edge portion in the thin-line image data that is newly created by the thinning processing is indicated.

That is, in Processing 1 to Processing 3, an example of setting the pixel widths such that the ratio between a pixel width (the first pixel width) to be subjected to the thinning processing of an edge portion of input original image and a pixel width (the second pixel width) to be subjected to the intense exposure of an edge portion of thin-lined image data after the thinning processing is 1 to (1:1) is indicated.

Next, in Processing 4, the thinning processing of changing the light amount from the normal light amount to the light-off state for 1 pixel at the edge portion of the image data, on pixels having 20-pixel width in the main scanning direction is performed. Furthermore, in Processing 4, an example of performing the intense exposure processing of changing the light amount to intense exposure light having larger light amount than the normal light amount for 2 pixels at an edge portion in the thin-line image data that is newly created by the thinning processing is indicated.

In Processing 5, the thinning processing of changing the light amount from the normal light amount to the light-off state for 2 pixels at the edge portion of the image data, on pixels having 20-pixel width in the main scanning direction is performed. Furthermore, in Processing 5, an example of performing the intense exposure processing of changing the light amount to intense exposure light having larger light amount than the normal light amount for 4 pixels at an edge portion in the thin-line image data that is newly created by the thinning processing is indicated.

In Processing 6, the thinning processing of changing the light amount from the normal light amount to the light-off state for 3 pixels at the edge portion of the image data, on pixels having 20-pixel width in the main scanning direction is performed. Furthermore, in Processing 6, an example of performing the intense exposure processing of changing the light amount to intense exposure light having larger light amount than the normal light amount for 6 pixels at an edge portion in the thin-line image data that is newly created by the thinning processing is indicated.

That is, in Processing 4 to Processing 6, an example of setting the pixel widths such that the ratio between a pixel width (the first pixel width) to be subjected to the thinning processing of an edge portion of input original image and a pixel width (the second pixel width) to be subjected to the intense exposure of an edge portion of thin-lined image data after the thinning processing is 1 to (1:2) is indicated.

The high-resolution-image converting unit 1013 sets the ratio between the first pixel width and the second pixel width according to a proportion of the second light amount to the first light amount. Specifically, for example, when the second light amount (large light amount) is twice as much as the first light amount (normal light amount), the high-resolution-image converting unit 1013 sets the ratio between the first pixel width and the second pixel width to 1 to 1. Moreover, when the second light amount (large light amount) is 1.5 times as much as the first light amount (normal light amount), the high-resolution-image converting unit 1013 sets the ratio between the first pixel width and the second pixel width to 1 to 2.

That is, when a light emission level of an intense exposure pixel is compared with the normal light amount, in Processing 1 to Processing 3, by setting the intense-exposure light-emission level to 200%, the total sums of the entire light amount before and after the processing become substantially equivalent to each other. Furthermore, in Processing 4 to Processing 6, by setting the intense-exposure light emission level to 150%, the total sums of the entire light amount before and after the processing become substantially equivalent to each other.

As described, by making the ratio between the pixel width to perform the thinning processing (the first pixel width) and the pixel width to perform the intense exposure processing (the second pixel width) constant, a thin line and a character in a minute size can be reproduced clearly. Moreover, improvement in reproducibility of a thin line and a character in a minute point can be achieved with a configuration enabling fine adjustment such as thinning a line and thinning a character.

Furthermore, by setting the light amount levels such that the total sums of the entire light amount before and after processing becomes substantially equivalent to each other, image forming in which fluctuation in density of an image is suppressed in the thinning processing and the intense exposure processing is enabled. In addition, image forming with high reproducibility of a thin line and character in which an edge portion in an image, such as a thin line and a character in a minute point size, that is likely to be blurry is clear is enabled.

In the present embodiment, although the vertical line image is exemplified in FIG. 13, it is not limited thereto, and the same logic can be applied to a horizontal line image extending in the main-scanning direction, from which a vertical one-pixel line in the sub-scanning direction is extracted.

Figure 14:
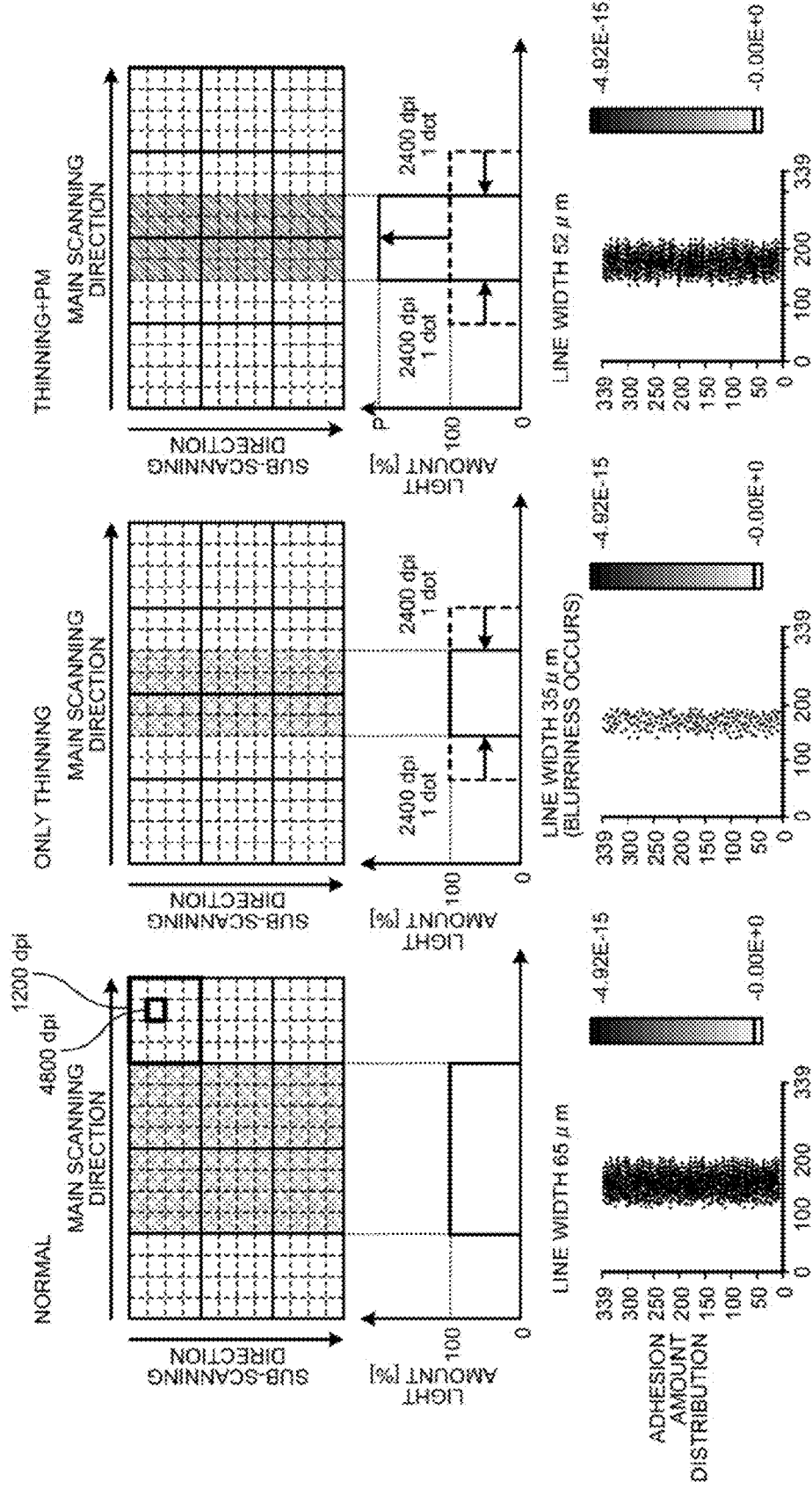
FIGS. 14A to 14C illustrate examples of image processing.

FIGS. 14A to 14C illustrate examples of image processing. As illustrated in FIG. 14A, according to an ordinary scheme, a line width becomes about 65 micrometers (μm) to be substantially thick relative to an ideal line width of 42 μm. In the present embodiment, tag data is created for a pixel to be subjected to the image processing (an edge portion in this example) in the tag creating/adding unit 3220 of the image processing unit 3023, and is transferred to the light-source driving unit 3224 to make a line thin, thereby enabling to perform the high resolution processing while suppressing increase in cost. Moreover, by performing the exposure power control at the same time, a lack of energy caused by processing in a minute region is prevented. Thus, as illustrated in FIG. 14C, by performing power modulation of an entire thin line in addition to the thinning, a line can be sharpened while suppressing blurriness. A illustrated in FIG. 14B, if only the thinning is performed cutting an edge of a thin line, blurriness occurs and a disorder occurs in an image, to degrade the line quality.

Figure 15:
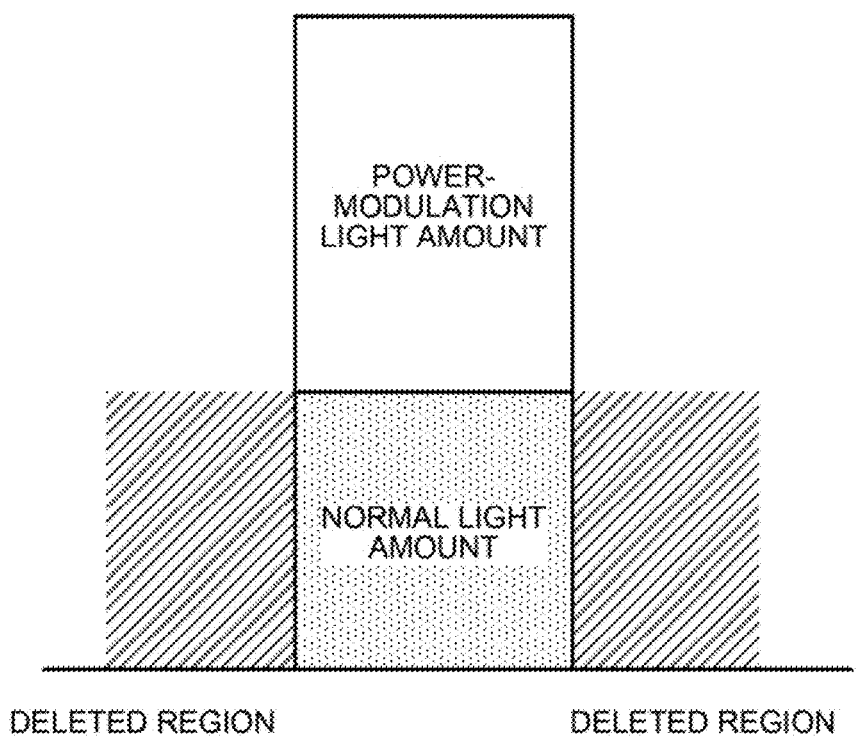
FIG. 15 illustrates an example of substantially equalizing an amount of loss of integrated light due to thinning a line and an increased amount of integrated light due to power modulation.

As illustrated in FIG. 15, the resolution converting unit 101 may arrange an amount of loss of integrated light due to thinning and an increased amount in the integrated light amount due to power modulation are substantially the same.

As described above, the light-source-modulation-data creating unit 3222 includes the pixel counting unit 106. The pixel counting unit 106 counts an addition value of a pixel density considering the light amount, based on a data-width setting signal and a light-amount setting signal from the resolution converting unit 101. A counting method of pixels is explained in detail later.

Figure 16:
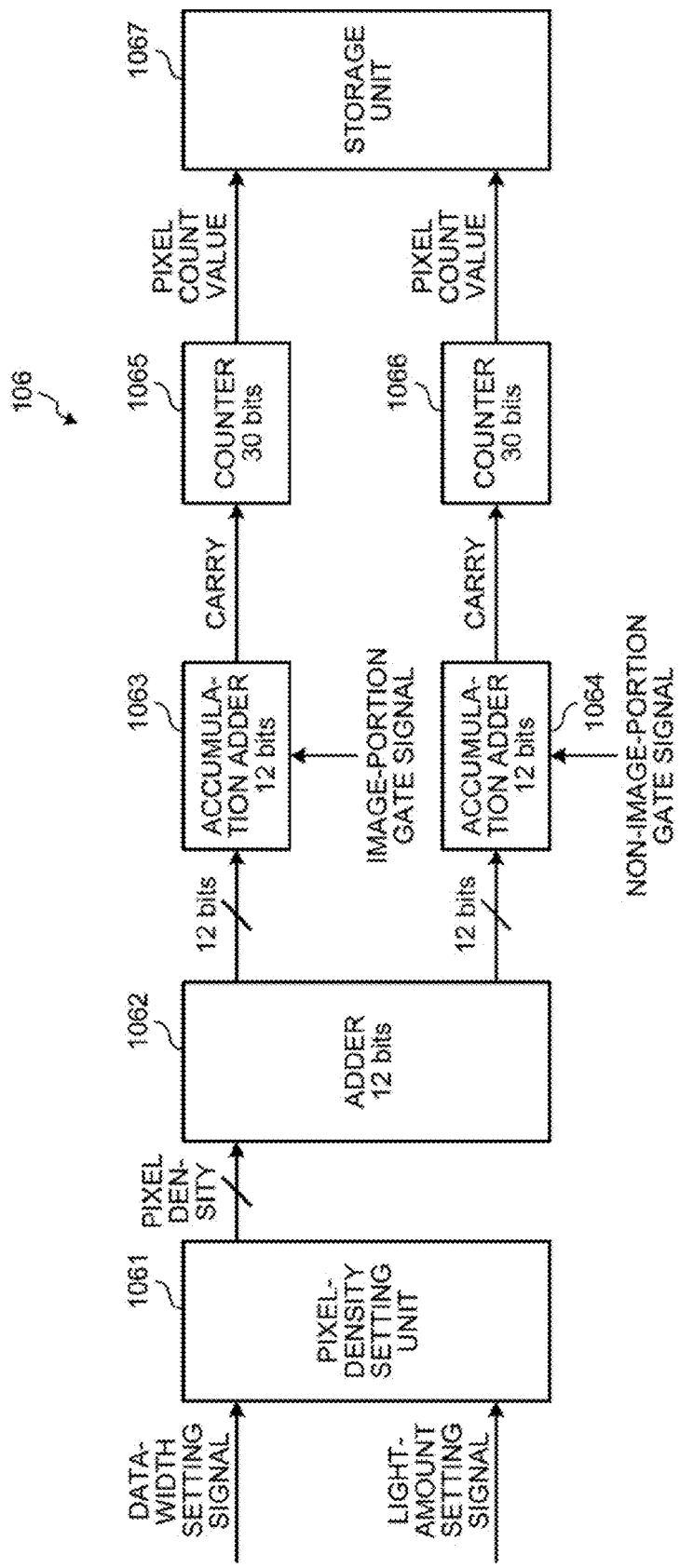
FIG. 16 is a block diagram of a configuration of a pixel counting unit.

FIG. 16 is a block diagram of a configuration of the pixel counting unit 106. As illustrated in FIG. 16, the pixel counting unit 106 includes a pixel-density setting unit 1061, an adder 1062, an image-portion-accumulation adder 1063, a non-image-portion-accumulation adder 1064, an image portion counter 1065, a non-image portion counter 1066, and a storage unit 1067.

The number of bits of a signal (the data-width setting signal, the light-amount setting signal, a data image density, and the like) in each of the adders 1062 to 1064 and each of the counters 1065 to 1066 is one example when pixel counting is performed in a unit of main scanning 2400 dpi×sub-scanning 4800 dpi, and a countable image size is the main scanning 330 millimeters (mm)×the main scanning 5922 mm. The image size and like are not limited thereto.

The pixel-density setting unit 1061 refers to the data-width setting signal and the light-amount setting signal from the resolution converting unit 101, and sets a pixel density of each corresponding pixel. Specifically, the pixel-density setting unit 1061 refers to a look-up table (LUT) in which the data-width setting signal and the light-amount setting signal from the resolution converting unit 101 are associated with the pixel density setting value of each pixel, and acquires the pixel-density setting value of each pixel used in counting.

FIG. 17 illustrates a concept of the LUT. The LUT illustrated in FIG. 17 illustrates a concept of the density setting relating to the pixel counting. In FIG. 17, an exposure condition according to the data-width setting signal and the light-amount setting signal is as follows.

1. data-width setting signal=0, light-amount setting signal=0-->no exposure
2. data-width setting signal=0, light-amount setting signal=1-->no exposure
3. data-width setting signal=1, light-amount setting signal=0-->normal exposure with the first light amount
4. data-width setting signal=1, light-amount setting signal=1-->intense exposure with the second light amount That is, as illustrated in FIG. 17, when exposure is not performed, the pixel-density setting value is set to "0". Moreover, as illustrated in FIG. 17, when normal exposure is performed with the first light amount, the pixel-density setting value is set to "1". Furthermore, as illustrated in FIG. 17, when intense exposure is performed with the second light amount, the pixel-density setting value is set to "2". The pixel-density setting value thus set is to be used in counting in a later stage. That is, the pixel-density setting value is an addition value of pixel density considering a width of a pixel and a light amount.

FIG. 18 illustrates one example of the LUT. The LUT illustrated in FIG. 18 illustrates one example of the density setting relating to the pixel counting. In the LUT illustrated in FIG. 18, the data-width setting signal and the light-amount setting signal are 2 bits, and the pixel-density setting value is of 16 levels of grays. The pixel-density setting value is a register (addgmm0-addgmmf) that can be arbitrarily set. The register of the LUT can be arbitrarily set through the printer control device 2090 as illustrated in FIG. 9. Thus, an error in toner consumption that is acquired separately and the like can be fed back to the counter as an arbitrary value.

The data-width setting signal and the light-amount setting signal of the LUT may also be enabled to be set arbitrarily. Thus, an error between a count value and an actual toner consumption amount can be reduced.

The pixel-density setting unit 1061 outputs the acquired pixel-density setting value to the adder (adder circuit) 1062.

The adder 1062 is a full adder circuit of 12 bits. The adder 1062 adds the pixel-density setting values acquired from the pixel-density setting unit 1061, to output to the image-portion accumulation adder circuit 1063 or the non-image-portion accumulation adder circuit 1064.

As illustrated in FIG. 16, the image-portion-accumulation adder 1063 and the image portion counter 1065 count the number of on-pixels in an image portion (within a period of an image-portion gate signal). Moreover, the non-image-portion-accumulation adder circuit 1064 and the non-image portion counter 1066 count the number of on-pixels of a non-image portion (a non-image-portion gate signal=out of a period of an image-portion gate signal).

More specifically, the image-portion-accumulation adder 1063 counts data that is obtained by adding data from the adder 1062 by the image-portion-accumulation adder 1063 and by reflecting to a calculation result considering a carry by the image portion counter 1065 of 30 bits. The image portion counter 1065 is reset by the image-portion gate signal assertion, and latches a pixel count value by the image-portion gate signal negation, and stores the pixel count value in the storage unit 1067.

On the other hand, the non-image-portion-accumulation adder 1064 counts data that is obtained by adding data from the adder 1062 by the image-portion-accumulation adder 1064 and by reflecting to a calculation result considering a carry by the non-image portion counter 1066 of 30 bits. The non-image portion counter 1066 is reset by the image-portion gate signal negation, and latches a pixel count value by a non-image-portion-adjustment gate signal, and stores the pixel count value in the storage unit 1067. The non-image-portion adjustment gate signals are various kinds of adjustment gate signals in image forming process for a non-image portion. For example, the non-image-portion adjustment gate signal is, for example, a gate signal obtained by ORing P sensor pattern fgate, blade pattern fgate, and MUSIC pattern fgate. That is, generation of a toner adhesion amount measuring pattern (P pattern) performed when paper is not applied, generation of a color-misregistration measuring pattern (MUSIC pattern), and cleaning of the P pattern and the MUSIC pattern are image forming process for a non-image portion.

Furthermore, as illustrated in FIG. 9, the pixel count value stored in the storage unit 1067 is informed to the printer control device 2090. The printer control device 2090 outputs a toner-cartridge-change informing signal to the display unit 2091 when the pixel count value reaches a predetermined toner-amount setting value at which toner-cartridge is required to be changed, and displays information (notification) of necessary replacement to a user. Thus, by informing a user of a toner cartridge replacement time, it is possible to avoid waste by replacement at an appropriate remaining amount, and avoid being out of toner.

The pixel value stored in the storage unit 1067 may be determined per page. In this case, the printer control device 2090 outputs a toner supply signal to the toner replenishing unit 2092 when a predetermined toner supply amount per page is reached. The toner replenishing unit 2092 that has received the toner supply signal supplies toner to the toner cartridges (2034a, 2034b, 2034c, 2034d). This enables to replenish toner, and to print at a stable image quality.

As described, according to the present embodiment, as for a thin line and a character in a minute point size, by thinning lines by the thinning processing and the intense exposure on a thin-lined edge portion, a clear toner image can be acquired even for a thin line and a character in minute point size, and high quality image forming with high reproducibility for an original image can be achieved. Moreover, by counting the density setting value considering a width of pixel and a light amount at the time of performing the thinning processing and the intense exposure processing described above, a toner consumption amount can be accurately measured.

In the present embodiment, a tandem multi-color printer 2000 that forms a full color image by superimposing four colors (KCMY) is adopted as an image forming apparatus. However, the image forming apparatus is not limited thereto, and an image processing apparatus (light beam division) in which an identical optical system is shared among different colors may be adopted. In this case, the pixel counting unit 106 may include the storage unit 1067 storing a pixel count value separately per color.

According to the present invention, effects that a thin line and a character in minute size (character in a minute point size) can be clearly reproduced, and a toner consumption amount can be accurately measured at the time of performing processing to improve the reproducibility are produced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A light-source-driving control device comprising circuitry configured to:
   convert a first resolution of image data into high resolution and perform thinning processing of thinning a pixel at an edge portion of the image data by a first pixel width, so as to create image data with a second resolution;
   set a second pixel width at the edge portion of the image data with the second resolution such that a ratio between the first pixel width and the second pixel width is constant;
   create light amount information including a first light amount with which a pixel not included in the set second pixel width is exposed, and a second light amount larger than the first light amount, the second light amount with which a pixel included in the second pixel width is exposed;
   generate a light-source-modulation pulse signal and a power-modulation control signal based on the image data with the second resolution;
   select either one of the first light amount and the second light amount as light-amount application current data based on the generated power-modulation control signal, the first light amount with which a pixel not included in the second pixel width of the edge portion thin-lined by the thinning processing is exposed, the second light amount with which a pixel included in the second pixel width of the edge portion is exposed with an increased light amount from the first light amount to perform intense exposure processing;
   drive light sources corresponding to respective colors, according to the selected light-source application current data, and the light-source-modulation pulse signal; and
   count an addition value of pixel density considering a width of pixel and a light amount, based on a data-width setting signal based on the created second pixel width, and on a light-amount setting signal based on the created light amount information.

2. The light-source-driving control device according to claim 1, wherein
   the circuitry is further configured to refer to a look-up table in which the addition value of pixel density is associated with the data-width setting signal and the light-amount setting signal, and acquire an addition value of the pixel density per pixel used in the counting.

3. The light-source-driving control device according to claim 2, wherein
   the addition value of the pixel density of the look-up table is a register that can be arbitrarily set.

4. The light-source-driving control device according to claim 2, wherein
   the data-width setting signal and the light-amount setting signal of the look-up table can be arbitrarily set.

5. The light-source-driving control device according to claim 1, wherein
   the circuitry is further configured to inform a control device that controls a display unit displaying various kinds of information related to image forming of the counted addition value of the pixel density, for comparison with a predetermined toner-amount setting value at which a toner cartridge is to be replaced.

6. The light-source-driving control device according to claim 1, wherein
   the circuitry is further configured to inform a control device that controls a toner replenishing unit that supplies toner to a toner cartridge used in image forming of the counted addition value of the pixel density, for comparison with a toner supply amount set per page in advance.

7. An image forming apparatus comprising:
   a control device configured to receive image data from a higher level device;
   an image forming station configured to form an image in multiple colors according to the image data;
   an optical scanning device that includes a light source emitting a laser beam to the image forming station; and
   the light-source-driving control device according to claim 1 that drives the light source.

8. A light-source driving method comprising:
   converting a first resolution of image data into high resolution and performing thinning processing of thinning a pixel at an edge portion of the image data by a first pixel width, so as to create image data with a second resolution;

setting a second pixel width at the edge portion of the image data with the second resolution such that a ratio between the first pixel width and the second pixel width is constant;

creating light amount information that includes a first light amount with which a pixel not included in the set second pixel width is exposed, and a second light amount larger than the first light amount, the second light amount with which a pixel included in the second pixel width is exposed;

generating a light-source-modulation pulse signal and a power-modulation control signal based on the image data with the second resolution;

selecting either one of the first light amount and the second light amount as light-amount application current data based on the generated power-modulation control signal, the first light amount with which a pixel not included in the second pixel width of the edge portion thin-lined by the thinning processing is exposed, the second light amount with which a pixel included in the second pixel width of the edge portion is exposed with an increased light amount from the first light amount to perform intense exposure processing;

driving light sources corresponding to respective colors, according to the selected light-source application current data and the light-source-modulation pulse signal; and counting an addition value of pixel density considering a width of pixel and a light amount, based on a data-width setting signal based on the created second pixel width, and on a light-amount setting signal based on the created light amount information.

\* \* \* \* \*